(12) United States Patent
Fouilloux et al.

(10) Patent No.: US 11,333,617 B2
(45) Date of Patent: May 17, 2022

(54) METHOD, DEVICE AND INSPECTION LINE FOR DETERMINING THE THREE-DIMENSIONAL GEOMETRY OF A CONTAINER RING SURFACE

(71) Applicant: TIAMA, Vourles (FR)

(72) Inventors: Julien Fouilloux, Lyons (FR); Marc Leconte, Loire sur Rhone (FR)

(73) Assignee: TIAMA, Vourles (FR)

( * ) Notice: Subject to any disclaimer, the term of this patent is extended or adjusted under 35 U.S.C. 154(b) by 0 days.

(21) Appl. No.: 16/958,261

(22) PCT Filed: Dec. 20, 2018

(86) PCT No.: PCT/FR2018/053479
§ 371 (c)(1),
(2) Date: Jun. 26, 2020

(87) PCT Pub. No.: WO2019/135041
PCT Pub. Date: Jul. 11, 2019

(65) Prior Publication Data
US 2020/0333259 A1    Oct. 22, 2020

(30) Foreign Application Priority Data

Jan. 5, 2018 (FR) .................. 18 50105
Jan. 10, 2018 (FR) .................. 18 50209

(51) Int. Cl.
*G01N 21/90* (2006.01)
(52) U.S. Cl.
CPC .............. *G01N 21/9054* (2013.01)
(58) Field of Classification Search
CPC ....... G01N 21/9054; G01N 2033/0081; G01N 21/9036; G01N 2291/2695; G01N 21/954; G01N 25/72; G01N 27/20; G01N 21/956; G01N 23/18; G01N 19/08; G01N 2223/646; G01N 21/90; G01N 21/909; G01N 21/9027; G01N 21/9045; G01N 21/8851; G01N 21/8806; G01N 21/9081; G01N 21/9009; G01N 21/9018;
(Continued)

(56) References Cited

U.S. PATENT DOCUMENTS 3,390,569 A   7/1968 McMeekin
4,284,353 A   8/1981 Yoshida et al.
(Continued)

FOREIGN PATENT DOCUMENTS

CN   1050768   4/1991
CN   1154469   7/1997
(Continued)

OTHER PUBLICATIONS

Symplex Hexkon, Seal Face-/Closure Wall Inspection, Industrielle Inspektionstechnik, 2005.

*Primary Examiner* — Michael P Stafira
(74) *Attorney, Agent, or Firm* — Clark & Brody LP

(57) ABSTRACT

The invention relates to a method, a device and an inspection line for determining the three-dimensional geometry of a container ring surface, including the formation, by two optical systems (24, 24'), of two images of the ring surface of the container, according to two peripheral observation fields having a first and a second observation elevation angle ($\gamma 1$, $\gamma 2$) different from each other.

38 Claims, 10 Drawing Sheets

(58) Field of Classification Search
CPC ..... G01N 2011/0073; G01N 2291/011; G01N
2291/015; G01N 2291/022; G01N
2291/02809; G01N 2291/02818; G01N
2291/02854; G01N 2291/0422; G01N
2291/044; G01N 2291/048; G01N
2291/102; G01N 2291/106; G01N
29/024; G01N 29/11; G01N 29/28; G01N
29/46; G01N 21/9072; G01N 35/08;
G01N 21/27; G01N 21/51; G01N
2201/0634; G01N 2021/8816; G01N
2021/8845; G01N 2021/8887; G01N
21/88; G01N 2201/061; G01N
2201/0626; G01N 2021/8427; G01N
2021/845; G01N 2021/8832; G01N
2021/8967; G01N 2021/9063; G01N
21/21; G01N 21/255; G01N 21/8422;
G01N 21/952; G01N 21/958; G01N
2201/06113; G01N 2201/0635; G01N
33/49; G01N 35/04; G01N 15/0205;
G01N 15/06; G01N 2015/0053; G01N
2015/0693; G01N 2015/1006; G01N
2015/105; G01N 2015/1495; G01N
2021/557; G01N 2021/646; G01N
2021/8416; G01N 2021/8455; G01N
2021/8812; G01N 2021/8825; G01N
2021/8829; G01N 2021/8835; G01N
2021/8848; G01N 2021/9516; G01N
21/314; G01N 21/3577; G01N 21/55;
G01N 21/643; G01N 21/85; G01N 21/93;
G01N 21/9515; G01N 2201/06126; G01N
2201/062; G01N 2201/0633; G01N
2201/0636; G01N 2201/0638; G01N
2201/065; G01N 2201/102
See application file for complete search history.

(56) References Cited

U.S. PATENT DOCUMENTS

| | | | |
|---|---|---|---|
| 4,606,435 A | 8/1986 | Miyazawa et al. | |
| 4,758,084 A | 7/1988 | Tokumi et al. | |
| 4,811,251 A | 3/1989 | Minato | |
| 4,914,286 A | 4/1990 | Chirovsky et al. | |
| 4,914,289 A | 4/1990 | Nguyen et al. | |
| 4,959,538 A | 9/1990 | Swart | |
| 5,072,107 A | 12/1991 | Apter | |
| 5,661,294 A | 8/1997 | Buchmann et al. | |
| 5,699,152 A | 12/1997 | Fedor et al. | |
| 5,896,195 A | 4/1999 | Juvinall et al. | |
| 5,912,776 A | 6/1999 | Yaginuma | |
| 6,049,389 A | 4/2000 | Volay et al. | |
| 6,072,575 A | 6/2000 | Loll | |
| 6,172,748 B1 | 1/2001 | Sones et al. | |
| 6,256,095 B1 | 7/2001 | Ringlien | |
| 6,654,116 B1 | 11/2003 | Kwirandt | |
| 6,903,814 B1 | 6/2005 | Juvinall et al. | |
| 7,522,277 B2 | 4/2009 | Lehn et al. | |
| 2001/0048524 A1 | 12/2001 | Sones | |
| 2004/0150815 A1 | 8/2004 | Sones et al. | |
| 2004/0263620 A1 | 12/2004 | Diehr | |
| 2006/0051086 A1 | 3/2006 | Schroter et al. | |
| 2006/0126060 A1 | 6/2006 | Colle et al. | |
| 2006/0140470 A1 | 7/2006 | Watanabe | |
| 2006/0176474 A1 | 8/2006 | Lehn et al. | |
| 2008/0094617 A1 | 4/2008 | Diehr | |
| 2008/0186693 A1 | 8/2008 | White et al. | |
| 2009/0066944 A1 | 3/2009 | Gauffre et al. | |
| 2010/0128120 A1 * | 5/2010 | Garin | G01N 21/9054 348/135 |
| 2010/0211846 A1 | 8/2010 | Matsumoto et al. | |
| 2012/0147366 A1 | 6/2012 | Niedermeier | |
| 2014/0174127 A1 | 6/2014 | Dalstra | |
| 2014/0311256 A1 * | 10/2014 | Cochran | G01N 21/9081 73/862.08 |
| 2016/0059343 A1 | 3/2016 | Nam et al. | |
| 2017/0016833 A1 * | 1/2017 | Huibregtse | G01N 21/9036 |
| 2018/0172603 A1 * | 6/2018 | Piana | G01B 11/24 |

FOREIGN PATENT DOCUMENTS

| | | | | |
|---|---|---|---|---|
| CN | 1312464 | | 9/2001 | |
| CN | 102132148 | | 7/2011 | |
| CN | 202649134 | | 1/2013 | |
| CN | 202649136 | | 1/2013 | |
| CN | 105492862 | | 4/2016 | |
| CN | 107003252 A | * | 8/2017 | ......... H04N 5/2252 |
| DE | 29 16 361 | | 11/1980 | |
| DE | 2916361 | | 11/1980 | |
| DE | 20 2012 104043 | | 11/2012 | |
| DE | 202012104043 U1 | * | 11/2012 | ......... G01N 21/9054 |
| EP | 0047936 | | 3/1982 | |
| EP | 0047936 A1 | * | 3/1982 | ............. G01B 11/24 |
| EP | 0371546 A1 | * | 6/1990 | ......... G01N 21/9054 |
| EP | 0209077 B1 | * | 9/1992 | ......... G01N 21/9054 |
| EP | 0 657 732 | | 6/1995 | |
| EP | 0657732 A1 | * | 6/1995 | ......... G01N 21/9054 |
| FR | 2846422 | | 4/2004 | |
| FR | 2846424 A1 | * | 4/2004 | ......... G01N 21/9054 |
| FR | 2884611 | | 10/2006 | |
| FR | 2896041 | | 7/2007 | |
| JP | 63-72552 | | 5/1988 | |
| JP | 2009-150767 | | 7/2009 | |
| JP | 2014006237 A | * | 1/2014 | ......... G01N 21/9054 |
| WO | 90/04773 | | 5/1990 | |
| WO | WO-9631768 A1 | * | 10/1996 | ........... G01N 21/909 |
| WO | 2008/050067 | | 5/2008 | |
| WO | 2008/129650 | | 10/2008 | |
| WO | 2009/004773 | | 8/2010 | |
| WO | 2016/059343 | | 4/2016 | |
| WO | WO-2018007745 A1 | * | 1/2018 | ......... H04N 5/23238 |

* cited by examiner

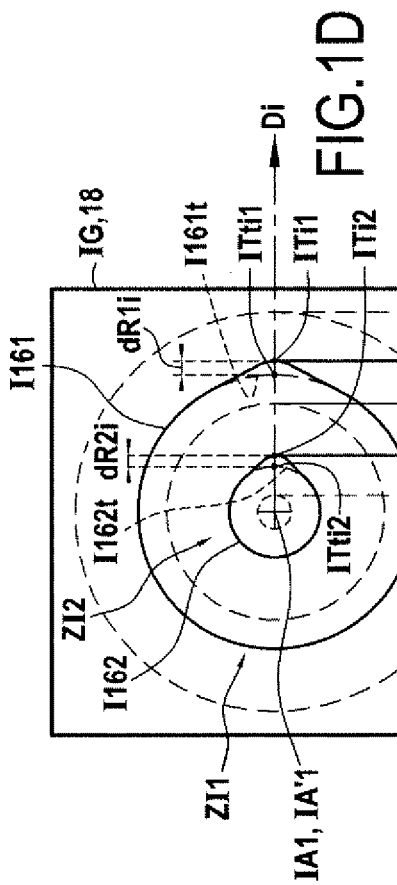
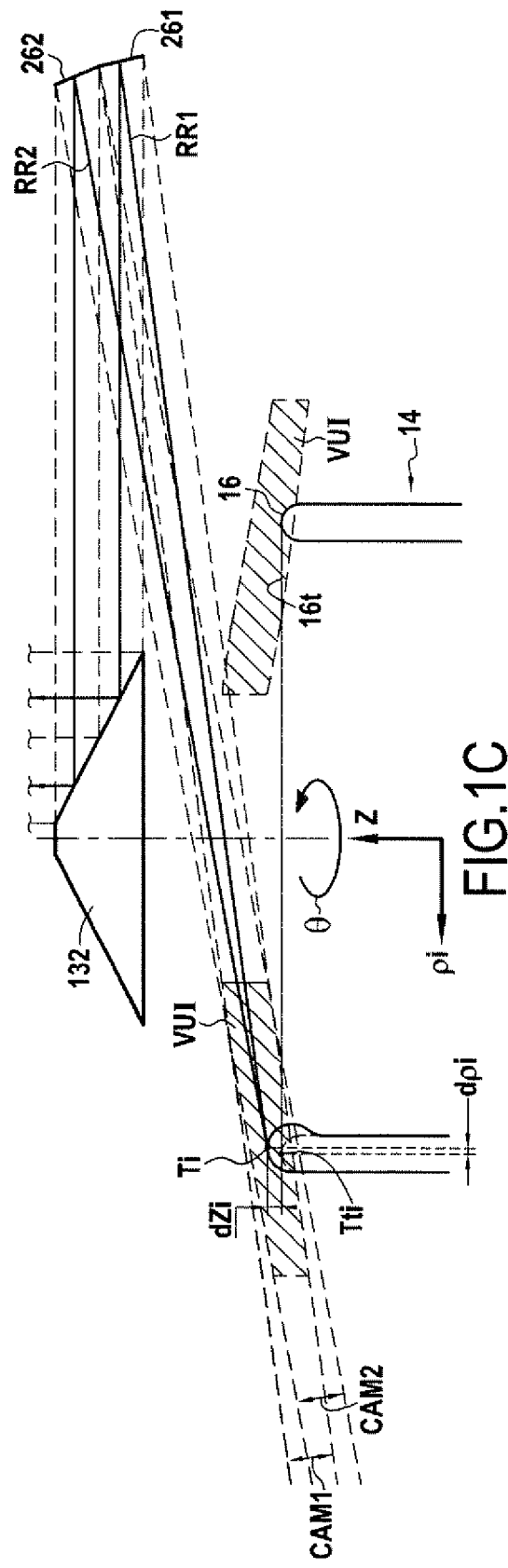

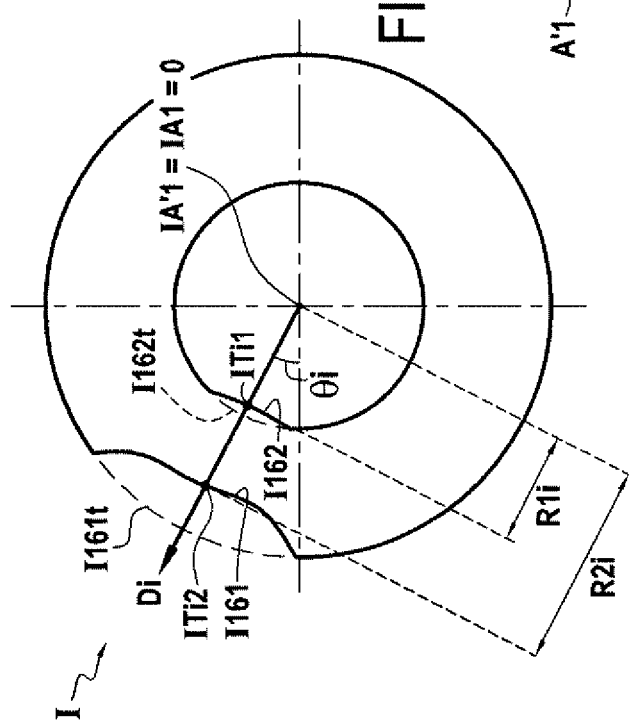
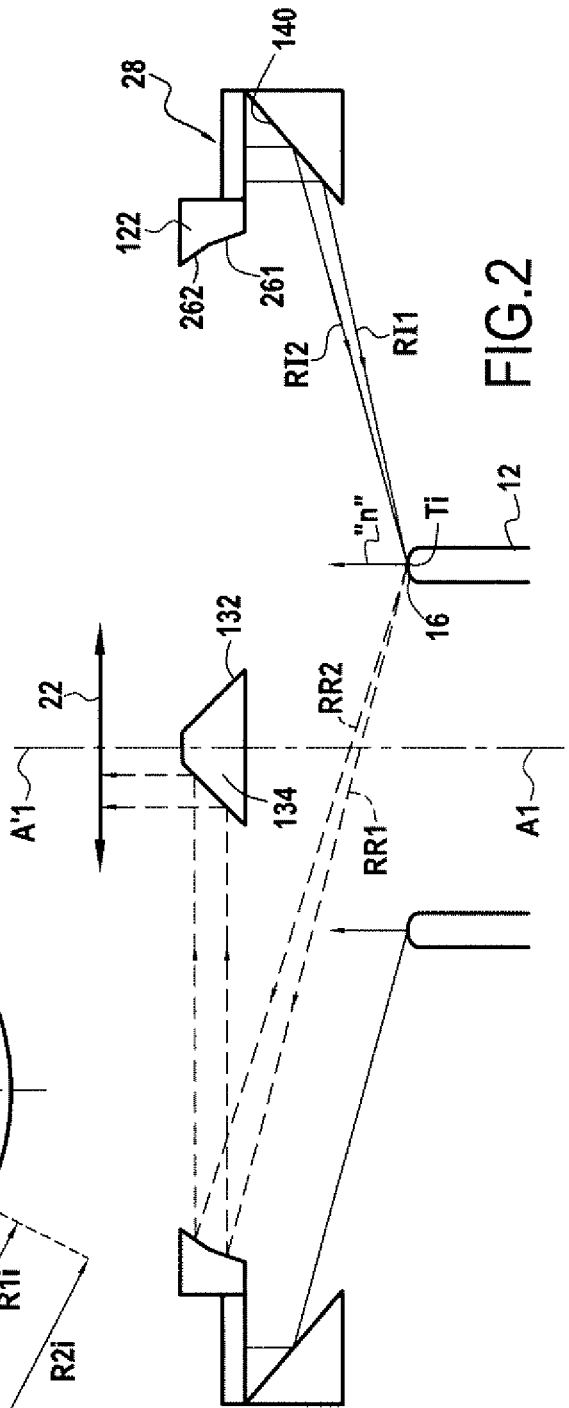

METHOD, DEVICE AND INSPECTION LINE FOR DETERMINING THE THREE-DIMENSIONAL GEOMETRY OF A CONTAINER RING SURFACE

The invention relates to the field of the inspection of the containers, in particular containers made of glass, and more specifically the control of the evenness of the ring surface of such containers.

The ring surface is the upper surface or the upper ridge of the ring of the container. Of annular shape about a theoretical central axis of the ring, the ring surface is more or less thick along a direction radial to the theoretical central axis. In theory, this surface is planar in a plane perpendicular to the theoretical central axis, in the sense that it has at least one continuous contact line on 360 angle degrees about the axis with this plane, and it is perfectly circular. While being planar in the sense above, its profile in sections through a radial plane containing the theoretical central axis can have different shapes: the profile can be flat, rounded, inverted V-shaped, etc.

In many applications, the ring surface is the one that is intended to come into contact with the seal of the cover or of the cap. When the ring surface is not planar, leaks will be possible after closure. It is therefore important to know the unevenness of the ring surface. This unevenness can be analyzed, at a given point of the ring surface, as a height difference understood in this text as a position difference, along a direction parallel to the theoretical central axis of the ring of the container, between a given point of the actual ring surface of the container and the corresponding point of a theoretical ring surface. These two points are matching in that, in a system of cylindrical coordinates, centered on the theoretical central axis, the corresponding points have the same angular coordinate, and belong, for the one to the actual ring surface, and for the other to the theoretical ring surface. This theoretical surface is therefore planar with respect to a reference plane perpendicular to the theoretical central axis. This reference plane can be linked to the considered container, and can for example correspond to the height of the highest point of the actual ring surface, to the height of the lowest point of the actual ring surface, to an average height of the ring surface over its angular extent, etc. The reference plane can also be defined independently of the container, with reference for example to a viewing, control or measurement device.

The unevenness of the ring surface is often distinguished into at least two types. Defects of the "dip"-type are linked to problems of filling the ring mold with the molten glass during manufacture. They are characterized by height deviations which extend over small angular amplitude about the theoretical central axis. Defects of the "saddle"-type are generally less marked height deviations, which extend over greater angular amplitude about the theoretical central axis, but are nevertheless inconvenient defects, often due to sagging, to problems during the extraction of the articles from the mold, or to thermal problems during the manufacture.

The ring surface may have other geometry defects. It can for example have a characteristic plane inclined with respect to the body of the article or with respect to the bottom of the article. A characteristic plane of the ring surface can be a mid-plane, or a geometric plane based on the ring. It is considered that the ring is inclined if this characteristic plane is not parallel to the plane for laying the article, or not orthogonal to the axis of symmetry of the article, with an angle greater than a given threshold.

The ring surface, and generally the entire ring, may have a defect in the roundness, for example an ovalization, that is to say the ring surface seen from above, or the planar section of the ring by a horizontal plane, is neither a circle nor an annulus. For example, the shape is that of an oval or the shape may have a crushing.

Currently, the unevenness is detected mainly by a system called "bell" system by detection of gas leaks. The residual leak is measured when a planar metal surface is pressed on the ring. The disadvantage is that the control does not give any element that allows assessing the extent of the defect, but only allows obtaining a binary indication (leak/no leak) indicative of the evenness or unevenness of the surface. Such a system requires mechanical means for relatively moving the container relative to the device, which are not only costly but which also slow down the rate of the inspection line: raising and lowering of the bell, temporary immobilization of the article under the bell, etc. In addition, there is an actual interest in removing any contact with the ring of the article to avoid risks of breakage or pollution.

According to the patent U.S. Pat. No. 6,903,814 B1, it is planned to measure the height of the ring in 4 points disposed at 90 angle degrees, by means of 4 laser triangulation distance sensors, adapted to the specular reflection. The article is rotated and the position of a point with respect to the plane passing through the 3 other ones is compared at each increment of rotation. Several calculation alternatives are possible, but the disadvantage of the system are on the one hand the costly use of handling equipment for the rotation and on the other hand the difficulty of completely separating the effects of the rotational defects from the effects of unevenness, in spite of convolution calculations.

Vision systems are also known in which the rings are observed according to at least two views from a high angle or a low angle. A diffuse lighting located opposite the cameras relative to the articles lights the article to be controlled in transmission. The disadvantage of this system is that it requires at least two cameras and two light sources and possibly two telecentric optics and their supports and settings. The assembly is costly, and requires long optical paths, which results in a significant bulk.

To overcome these disadvantages, it has been proposed to use, as disclosed above, cameras already provided for carrying out another control of the container, for example, in the case of transparent glass bottles, a control of aspect in the shoulder. However, this requires choosing positions for the control device which can only be a compromise between the settings for detecting the defects in the shoulder area and the settings for detecting the geometric defects in the ring surface. These compromises are not satisfactory either for the measurement initially targeted by these cameras, or for the measurement of evenness desired to be made thereby.

By multiplying the angles of view, in particular by combining similar views under different high or low angles, it is also possible to measure in 3D portions of the ring and then to collect these measurements to reconstruct by calculation the total geometry of the ring surface. It uses the acquisition of several optical images. These optical images are then combined two by two by algorithms for matching points in pairs, from which actual points in 3D coordinates are calculated by triangulation. The technique is that of the stereovision with complex algorithms. Several pairs of stereovision views are necessary, which therefore requires for example 4 or 6 cameras. These systems can be accurate, but they are very costly and very bulky. Due to the numerous parameters, the accuracy is not kept in operation for a long time.

Document U.S. Pat. No. 6,172,748 describes a device including several distinct light sources which light the ring from below, that is to say from a point located below a plane perpendicular to the axis of the ring and tangent to the ring surface. The device includes several distinct mirrors which each provide an image of only one angular sector of the ring. An additional camera makes a top view of the ring surface. Even if the lateral images overlap, there is an azimuthal angular discontinuity between the images because, at a possible point of overlapping of the two images, there is a point breakage seen between the overlapping points in each of the images. This makes a computer reconstruction of the image necessary, which requires complex algorithms jeopardizing the measurement accuracy.

Document WO-2016/059343 of the applicant describes an innovative method for viewing the evenness of a ring surface, and an associated device. The methods and devices described in this document are particularly relevant but can be sensitive in particular to the off-centering or to an uncontrolled inclination of the ring surface.

Document WO-2008/050067 of the applicant describes a device that allows observing an area to be inspected of a container from several different viewing angles.

An objective of the invention is therefore to propose a method and device for determining the three-dimensional geometry of a ring surface, in particular with a view to determining the presence of possible unevenness which remain simple to implement but whose results are less influenced by an off-centering or an uncontrolled inclination of the ring surface with respect to the installation axis.

Also, the invention proposes in particular a method for determining a three-dimensional geometry of an actual ring surface of a container, the ring surface having a theoretical planar and annular or circular geometry about a theoretical central axis, of the type including:
  the lighting of the actual ring surface of the container, from above, using a first peripheral incident light beam comprising first incident radial light rays contained in radial planes containing the theoretical central axis and distributed at 360 angle degrees about the installation axis, said first incident radial light rays being directed towards the theoretical central axis, and some of the first incident radial light rays of the first incident light beam being reflected by specular reflection on the ring surface, in the form of reflected rays;
  the formation, with the reflected rays and via a first optical system, of a first planar optical image of the ring surface of the container, on a first two-dimensional photoelectric sensor able to deliver a first overall digital image;
  and of the type in which the step consisting in forming a first planar optical image includes the observation of the ring surface, from above, by a first optical system, according to a first peripheral observation field which observes the ring surface according to first radial observation rays which are contained in radial planes containing the theoretical central axis and which are distributed at 360 angle degrees about the theoretical central axis, the first peripheral observation field having a first observation elevation angle, which in some cases will be less than or equal to 45 angle degrees, sometimes less than 25 angle degrees, with respect to a plane perpendicular to the theoretical central axis, so as to collect on the first two-dimensional photoelectric sensor, in a first annular area of the sensor, rays reflected to form a first two-dimensional digital image in a first image area of the first overall digital image delivered by the first sensor.

The method is characterized in that it comprises:
  the formation, via a second optical system, of a second planar optical image of the ring surface of the container, distinct from the first planar image, on a second two-dimensional photoelectric sensor able to deliver a second overall digital image, by the observation of the ring surface, from above, by the second optical system, according to a second peripheral observation field, symmetrical in rotation about the theoretical central axis, which observes the ring according to second radial observation rays which are contained in radial planes containing the theoretical central axis, which are distributed at 360 angle degrees about the theoretical central axis, the second peripheral observation field having a second observation elevation angle with respect to a plane perpendicular to the theoretical central axis, but different from the first observation elevation angle, so as to collect on the second two-dimensional photoelectric sensor, in a second annular area of the sensor, reflected rays to form a second two-dimensional digital image of the ring surface in a second image area of the second overall digital image delivered by the second sensor;
  and in that the method includes the determination, for a number N of analyzed directions derived from a reference point of the considered digital image and angularly offset from each other around the reference point:
    of a first image point of the first two-dimensional digital image of the ring surface, on the analyzed direction, and of a first value representative of the distance from this first image point to the reference point in the first digital image;
    of a second image point of the second digital image of the ring surface, on the analyzed direction, and of a value representative of the distance from this second image point to the reference point in the second digital image;
  and in that the method deduces, for the N analyzed directions, by a geometric relation using the N first values, the N second values, the first observation elevation angle, and the second observation elevation angle, at least one value representative of an axial position, along the direction of the theoretical central axis, of each of the N points of the actual ring surface, whose images by the first optical system and the second optical system are respectively the N first image points and the N second image points.

According to other optional characteristics of the method, taken alone or in combination:
  The method may include:
    the simultaneous observation of the ring surface by the first optical system, according to the first peripheral observation field, and by the second optical system, according to the second peripheral observation field;
    the simultaneous formation, from the reflected rays collected according to the first and second peripheral observation fields, via the first and second optical systems, of the first and of the second two-dimensional image of the ring surface of the container simultaneously both in a first image area corresponding to the observation according to the first peripheral observation field and in a second image area corresponding to the observation according to the second peripheral observation field.

The first optical system may include a first primary reflection surface and the second optical system may include a second primary reflection surface, the two primary reflection surfaces being frustoconical surfaces of revolution, each generated by a line segment by revolution about the theoretical central axis, turned towards the theoretical central axis and arranged to reflect directly or indirectly light rays, coming from the actual ring surface under the corresponding observation elevation angle, in the direction of the associated sensor.

The formation of the first and of the second planar optical image can include for each the optical formation of a complete and continuous two-dimensional image of the actual ring surface.

The first peripheral incident light beam may include, in the same radial plane, non-parallel incident radial light rays.

The first incident beam can light the ring surface at an incidence such that, at the point of reflection of a first incident ray, whose ray reflected by the actual ring surface is seen by the first sensor according to the first peripheral observation field, the normal to the ring surface forms an angle less than 30 angle degrees with respect to the direction of the theoretical central axis.

The second incident beam can light the ring surface at an incidence such that, at the point of reflection of a second incident ray, whose ray reflected by the actual ring surface is seen by the second sensor according to a second peripheral observation field, the normal to the ring surface forms an angle less than 30 angle degrees with respect to the direction of the theoretical central axis.

The difference between the two observation elevation angles may be less than or equal to 20 angle degrees.

As an alternative, the second observation elevation angle can be greater than 65 angle degrees, or even greater than or equal to 75 angle degrees.

For the N directions Di, the method can deduce, for each direction, by a geometric triangulation relation using the distance from the first image point to the reference point in the first two-dimensional digital image, the distance from the second image point to the reference point in the second two-dimensional digital image, the first observation elevation angle, and the second observation elevation angle, at least one value representative of an axial offset, along the direction of the theoretical central axis, between the actual ring surface and a theoretical ring surface.

For the N directions Di:
the first value representative of the distance from the first image point to the reference point in the first two-dimensional digital image may be the value of a first radial image offset between a line representative of the first image of the ring surface and a theoretical line representative a theoretical ring surface image in the first image;
the second value representative of the distance from the second image point to the reference point in the second two-dimensional digital image can be the value of a second radial image offset between a line representative of the image of the ring surface and a theoretical line representative of a theoretical ring surface image in the second image;
and the method can deduce, for each direction, by a geometric triangulation relation using the first radial offset, the second radial offset, the first observation elevation angle, and the second observation elevation angle, at least one value representative of an axial offset, along the direction of the theoretical central axis, between the actual ring surface and a theoretical ring surface.

The line representative of the image of the ring surface can be the image, formed by the corresponding optical system on the associated sensor, of the reflection of the corresponding incident beam on the ring surface.

The first and second two-dimensional photoelectric sensors can be combined into the same two-dimensional photoelectric sensor delivering a common overall digital image, the first image area and the second image area being disjoint in the common overall digital image.

The invention also relates to a device for determining a three-dimensional geometry of an actual ring surface of a container, the ring surface having a theoretical planar and annular or circular geometry about a theoretical central axis, of the type in which the device has an installation area for a container, this installation area having an installation axis, of the type comprising:
a first lighting system having a first light source which has the installation axis as its axis, which has a diameter greater than the diameter of the ring surface and which is able to provide a first peripheral incident light beam comprising first incident radial light rays contained in radial planes containing the installation axis and distributed at 360 angle degrees about the installation axis, said first incident radial light rays being directed towards the installation axis;
a first two-dimensional photoelectric sensor, connected to an image analysis unit;
a first optical system interposed between the installation area for the container and the first sensor able to form on the sensor a first image of the ring surface of a container placed in the installation area;
of the type in which the first optical system includes at least a first primary reflection surface arranged in a downstream portion of the field-of-view of the first sensor, the first primary reflection surface being a frustoconical surface of revolution, generated by a line segment by revolution about the installation axis, turned towards the installation axis, and arranged to reflect, directly or indirectly, in the direction of the first sensor of the first light rays coming from the installation area according to radial planes containing the installation axis and according to a first peripheral observation field having a first observation elevation angle with respect to a plane perpendicular to the installation axis thus defining a first peripheral observation field which observes the ring surface according to first radial observation rays which are contained in a radial plane containing the installation axis, which are distributed at 360 angle degrees about the theoretical central axis, and which form with respect to a plane perpendicular to the installation axis the first observation elevation angle, which will be in some cases less than or equal to 45 angle degrees, sometimes less than 25 degrees;
and of the type in which the first lighting system, the first sensor and the first optical system are arranged above the installation area;
characterized in that
the device includes a second optical system, interposed between the installation area for the container and a second two-dimensional photoelectric sensor, and able to form on the sensor a second image of the ring surface of a container placed in the installation area;

in that the second sensor and the second optical system are arranged above the installation area;

in that the second optical system is configured to conduct, directly or indirectly, in the direction of the second sensor, second light rays coming from the installation area according to radial planes containing the installation axis and according to a second peripheral observation field having a second observation elevation angle with respect to a plane perpendicular to the installation axis thus defining a second peripheral observation field which observes the ring surface according to second radial observation rays which are contained in a radial plane containing the installation axis, which are distributed at 360 angle degrees about the theoretical central axis, and which form with respect to a plane perpendicular to the installation axis the second observation elevation angle, said second observation elevation angle being different from the first observation elevation angle;

and in that the first optical system and the second optical system determine for the first sensor and for the second sensor respectively a first upstream field-of-view portion and a second upstream field-of-view portion which overlap in the installation area according to a useful volume of inspection of revolution about the installation axis, such that any object point placed in the useful volume, and illuminated by at least the first light source so as to be imaged by a first image point in the first image formed by the first optical system on the first sensor, is also imaged by a second image point in the second image formed by the second optical system on the second sensor.

According to other optional characteristics of the device, taken alone or in combination:

In the first upstream field-of-view portion determined by the first optical system for the first sensor, the first radial observation rays determined by the first optical system can be, when followed from the useful inspection volume, centripetal in the direction of the installation axis, then can intersect the installation axis to become centrifugal in the direction of the first optical system.

The device can form two complete, distinct and continuous optical images of the actual ring surface on the associated two-dimensional photoelectric sensor.

The first primary reflection surface can indirectly reflect light rays in the direction of the sensor, and the device can include, between the first primary reflection surface and the first sensor, at least one secondary reflection surface.

The second optical system may include at least a second primary reflection surface in a downstream portion of the field-of-view of the second sensor, the second primary reflection surface being a frustoconical surface of revolution, generated by a line segment by revolution about the installation axis, turned towards the installation axis and arranged to reflect directly or indirectly in the direction of the sensor, light rays, coming from the installation area according to radial planes containing the installation axis and according to the second peripheral observation field having the second observation elevation angle with respect to a plane perpendicular to the installation axis.

The first primary reflection surface and the second primary reflection surface can indirectly reflect light rays in the direction of the sensor, and the device can include between, on the one hand, the first primary reflection surface and the second primary reflection surface and, on the other hand, the common sensor, at least a secondary reflection surface of revolution about the installation axis.

The first primary reflection surface and the second primary reflection surface may each include a frustoconical surface of revolution, turned towards the installation axis, having a small diameter and a large diameter both greater than the largest diameter of the theoretical ring surface so as to return, in the direction of the installation axis, light rays, coming from the actual ring surface under the corresponding observation elevation angle, said rays being intercepted by a send-back reflection surface which includes a frustoconical surface of revolution turned away from the installation axis so as to return the rays in the direction of the associated sensor.

The trajectory of the rays between the two primary reflection surfaces and the send-back reflection surface can be perpendicular to the installation axis.

The first primary reflection surface and the second primary reflection surface may each be a concave frustoconical surface and having an apex half-angle equal to half of the observation elevation angle, and having a small diameter and a large diameter both greater than the smallest diameter of the theoretical ring surface.

The difference between the two observation elevation angles can be less than 20 angle degrees.

The second upstream field-of-view portion determined by the second optical system for the second sensor, the second radial observation rays determined by the second optical system are, when followed from the useful inspection volume, centripetal in the direction of the installation axis, then intersect the installation axis to become centrifugal in the direction of the second optical system.

The second primary reflection surface can directly reflect light rays in the direction of the second sensor, without a secondary reflection surface of revolution.

In the second upstream field-of-view portion determined by the second optical system for the second sensor, the second radial observation rays determined by the second optical system can be, when followed from the useful inspection volume, centrifugal in the direction of the second primary reflection surface.

In the second upstream field-of-view portion determined by the second optical system for the second sensor, the second radial observation rays determined by the second optical system can be, when followed from the useful inspection volume, parallel to the installation axis or centripetal in the direction of the installation axis without intersecting the installation axis so as to move away from the installation axis when followed from the useful inspection volume towards the second optical system.

The second optical system can be devoid of any reflection surface of revolution.

The second observation elevation angle may be greater than 65 angle degrees, preferably greater than or equal to 75 angle degrees.

The first optical system may include a telecentric optical system.

The second optical system may include a telecentric optical system.

The first and second two-dimensional photoelectric sensors can be combined into the same common two-dimensional photoelectric sensor, the first primary reflection surface and the second primary reflection surface are both in disjoint portions of the downstream field-of-view of the sensor.

The first light source can be an annular source of revolution the axis of which is the installation axis.

The invention also relates to a line for inspecting containers having a ring surface, of the type in which containers are moved on a conveying line by a conveyor which transports the containers along a horizontal direction of movement perpendicular to a theoretical central axis of the containers which thus have their ring surface in a horizontal plane turned upwards, characterized in that the installation includes a device having any one of the characteristics above, which is arranged on the installation with its installation axis in a vertical position, such that the observation fields and the incident light beams are arranged downwards, towards the installation area which is located between the device and a transport member of the conveyor.

In such an inspection line, the conveyor can bring the containers such that their theoretical central axis coincides with the installation axis and, at the time of this coincidence, at least one image can be acquired thanks to the device, without contact of the device with the container.

Various other characteristics will emerge from the description given below with reference to the appended drawings which show, by way of non-limiting examples, embodiments of the object of the invention.

FIG. 1C is an enlarged axial sectional diagram illustrating the fields-of-view for the first embodiment of FIG. 1A.

FIG. 1D is a diagram of an image obtained with the device of FIG. 1A.

FIG. 1E is a diagram of another image obtained with the device of FIG. 1A.

FIG. 2 is an enlarged axial sectional diagram illustrating a variant of embodiment of a lighting system.

Figure 7A:
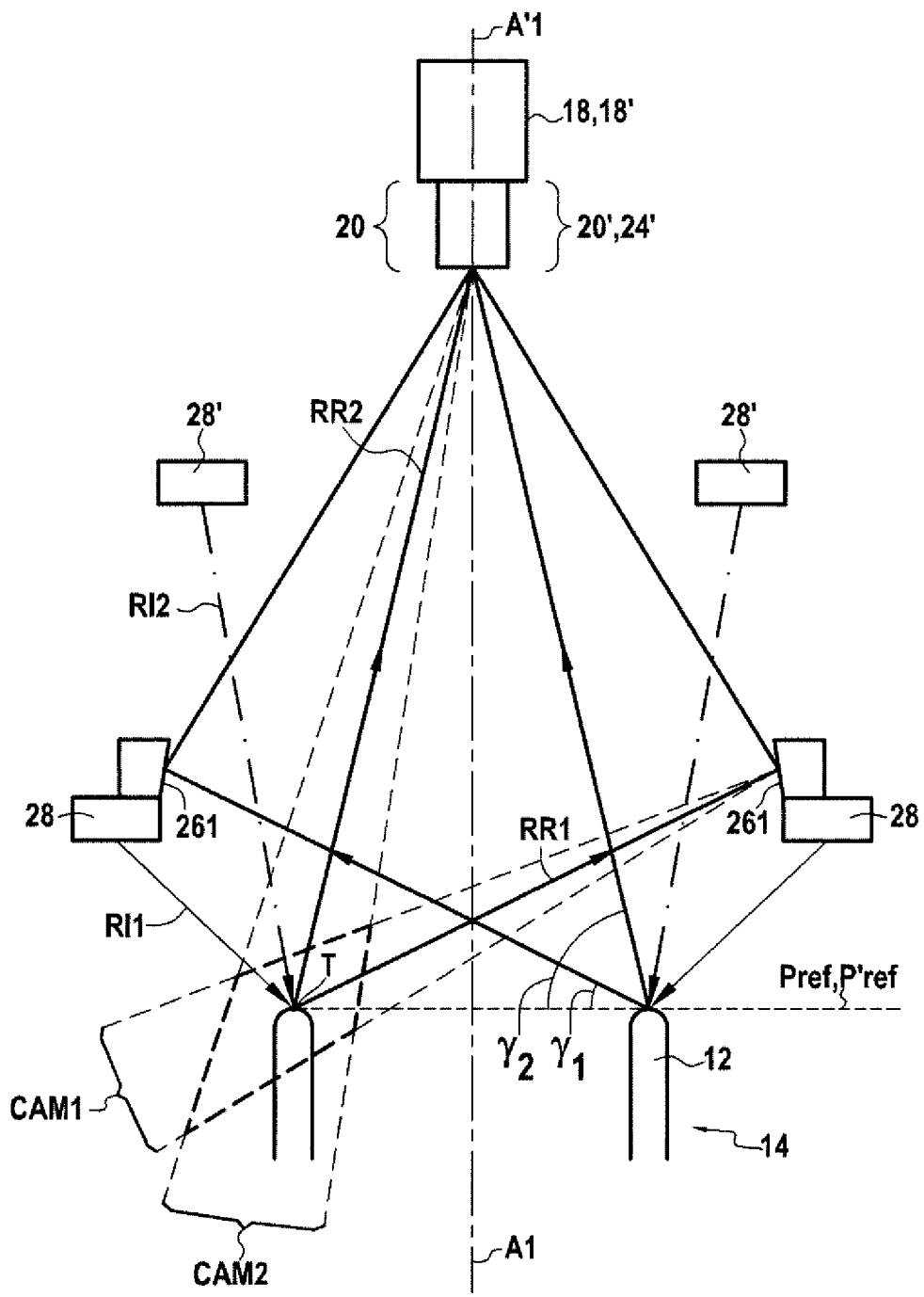
Figure 7B:
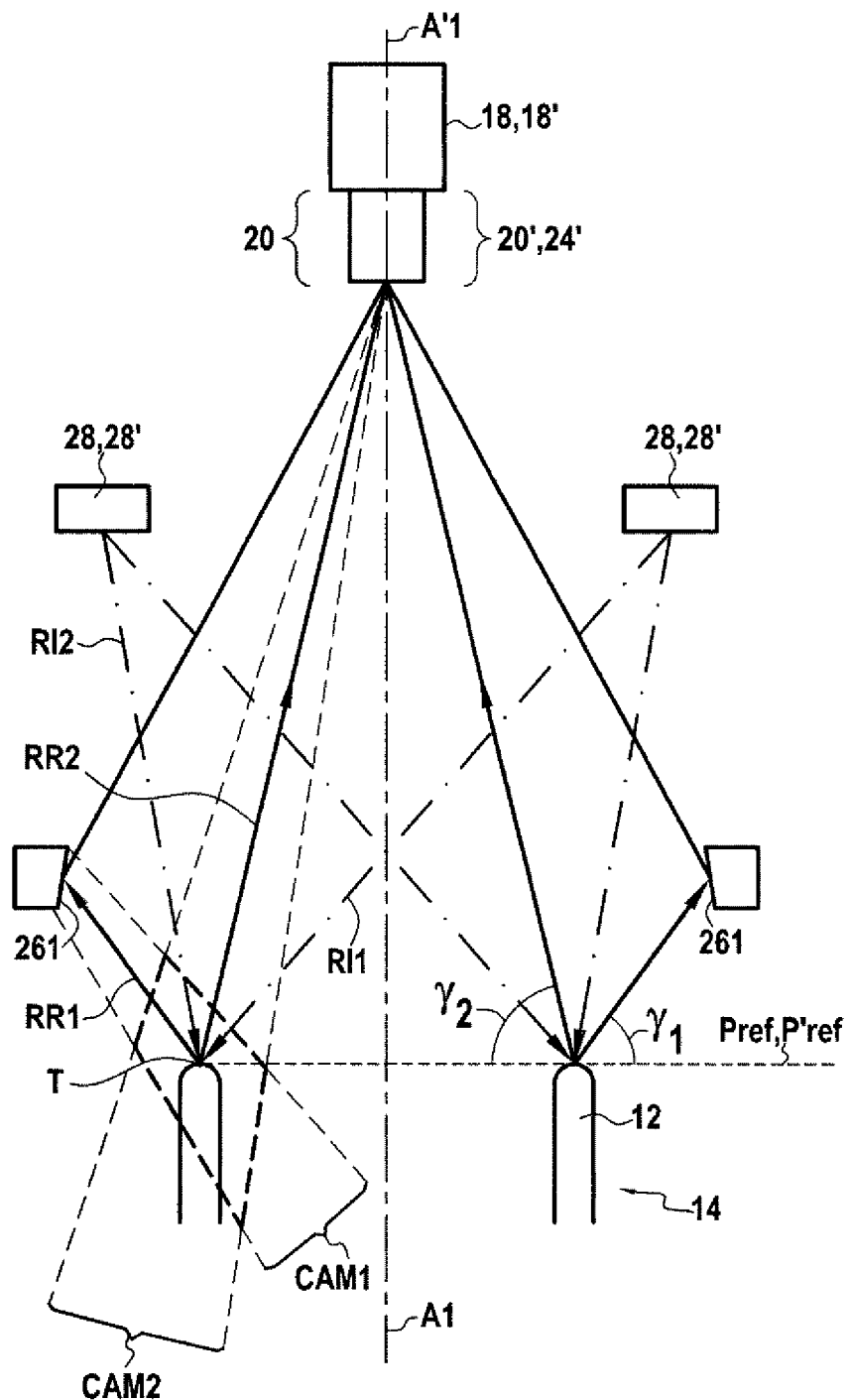

FIGS. 7A and 7B are views which illustrate variants of the invention in which none of the two observation elevation angles is less than 25 angle degrees. In the example of FIG. 7A, the first observation elevation angle is less than or equal to 45 angle degrees and the second observation elevation angle is greater than 45 angle degrees. In the example of FIG. 7B, the first and second observation elevation angles are both greater than 45 angle degrees.

Figure 1A:
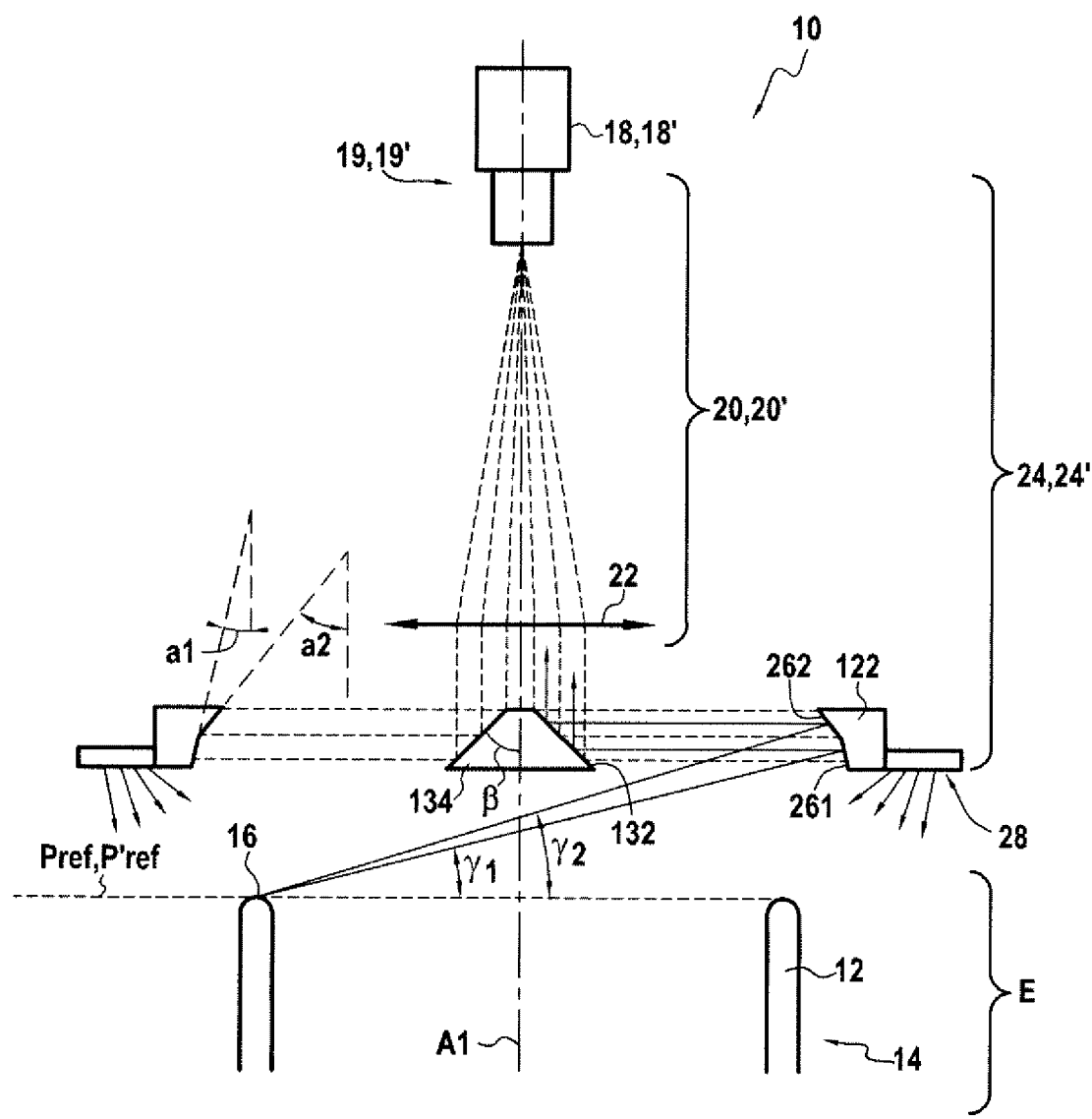
FIG. 1A is an axial sectional view of a first embodiment of a device according to the invention.
Figure 1B:
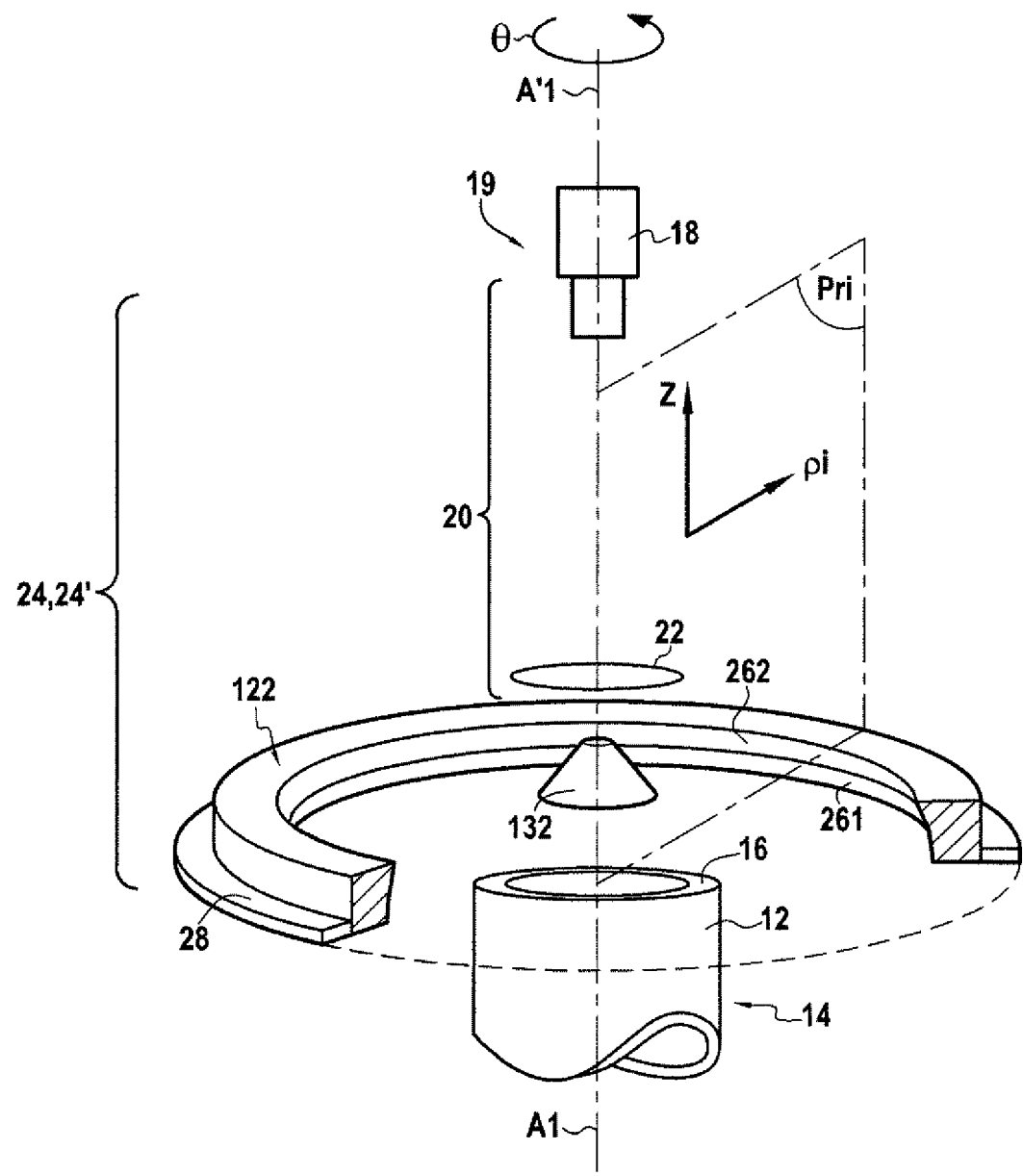
FIG. 1B is a perspective diagram of some elements of the first embodiment of FIG. 1A.

FIGS. 1A, 3, 4, 5, 7A, and 7B illustrate, in sections through a radial plane Pri as illustrated in FIG. 1B, different embodiments of a device for determining the three-dimensional geometry of an actual ring surface of a container, each of these devices allowing the implementation of a method according to the invention. The figures illustrate only the upper part of the ring 12 of a container 14. A container 14 is defined as a hollow vessel defining an interior volume which is closed over its entire volume periphery except at an upper ring 12 open at one end.

For convenience, and only by way of arbitrary definition, it will indeed be considered that the container includes a theoretical central axis A1, defined as being the theoretical central axis of its ring 12. It will also be arbitrarily considered that the ring is arranged at the upper end of the container. Thus, in the present text, the notions of high, low, upper and lower have a relative value corresponding to the orientation of the device 10 and of the container 14 as represented in the figures. However, it is understood that the invention could be implemented with an absolute orientation indifferent in space, insofar as the different components remain arranged with the same relative arrangement.

The ring 12 of the container is cylindrical of revolution about the axis A1. The body of the container, not represented, also may or may not be a volume of revolution. The ring 12 is connected through its lower end (not represented) to the rest of the body of the container, while its other free end, called upper end by arbitrary choice within the context of the present description, terminates in a ring surface 16.

The ring surface 16 is theoretically planar and parallel to a plane perpendicular to the axis A1, in the sense that it has at least one continuous contact line at 360 angle degrees about the theoretical central axis with such a plane, and it is theoretically circular or annular in this plane. In the present text, the actual ring surface of the container, on the one hand, and a theoretical ring surface, on the other hand, will be distinguished. This theoretical ring surface is therefore a planar surface or a planar circle in a reference plane perpendicular to the theoretical central axis A1. This reference plane can be defined as linked to the considered container, such as the reference plane PRef in FIG. 1A which is tangent to a point of the actual ring surface 16, for example the highest point along the direction of the theoretical central axis A1. Alternatively, this reference plane can for example be located at the height of the lowest point of the actual ring surface, at an average height of the ring surface over its angular extent, etc. The reference plane can also be defined independently of the container, with reference for example to one of the elements of the device 10, for example at a lower surface of a casing of the device 10. The reference plane can thus be a reference plane of the installation P'ref perpendicular to an installation axis as defined below.

The determination of the three-dimensional geometry of the ring surface can for example comprise the quantification of a position deviation, along the direction of the theoretical central axis A1, between a given point Ti of the actual ring surface and a corresponding point Tti of the theoretical ring surface. These two points are matching in that, in a system of cylindrical coordinates, centered on the theoretical central axis, the corresponding points Ti, Tti have the same angular coordinate, and belong, for the one to the actual ring surface and, for the other, to the theoretical ring surface. In other words, they are arranged in the same radial plane Pri containing the theoretical central axis A1.

In the illustrated examples, the ring surface 16 has, in sections through a radial plane containing the theoretical central axis, a bulged, convex radial profile between an inner edge and an outer edge. The inner edge can be considered as being at the intersection of the ring surface 16 and of an inner surface of the ring of the container, whose general orientation is close to that of the axis A1 of the container 14. However the profile of the ring surface 16, in sections through radial planes containing the theoretical central axis, could have a different shape: the profile can be flat, rounded, inverted V-shaped, etc.

To ensure a proper inspection of the container, it will be important to make sure that the container is presented appropriately in front of the device 10. For this, the device 10 according to the invention includes an installation area E in which the container must be installed. This installation area can be defined by an installation axis A'1 and an installation plane (not represented) defined as being a plane perpendicular to the installation axis A'1 located at the lowest point of the device. Thus, in order to be properly inspected, a container will be preferably presented so that its theoretical central axis A1 is at best parallel to the installation axis A'1, in particular if its laying plane is parallel to the installation plane. Thus, to be properly inspected, a container will also be preferably presented so that its theoretical central axis A1 corresponds at best to the installation axis A'1, and that its ring is presented with its open upper end turned in the direction of the device 10, but below the installation plane. In an ideal case, which will form the hypothesis of the explanations below, the two axes A1 and A'1 are coincident. However, with the invention, it will be seen that a possible shift, between the two axes A1 and A'1 (in the sense of a transverse deviation along a direction perpendicular to these axes A1 and A'1, and/or of an angular deviation between the two axes A1 and A'1) will be compensated by the invention and will not significantly affect the determination of the axial position of a point of the ring surface 16. It is understood that the entire device 10 according to the invention can be positioned above the installation plane while the container will be brought below the installation plane, without risk of contact with the device. The container 14 can therefore be brought into the installation area E by any motion, preferably in translation on a straight or non-straight trajectory, along a direction perpendicular to the installation axis without risk of interference with the device 10.

The device and the method according to the invention make use of at least one two-dimensional photoelectric sensor 18 intended to acquire a two-dimensional image of the actual ring surface of the container or, in some embodiments, two of such sensors 18, 18'. Such a sensor, also qualified as a matrix sensor, can be incorporated into a camera 19, 19' and can for example be of the CCD or CMOS type. Such a sensor 18, 18' is for example made up of a two-dimensional matrix of photoelectric elements. The sensor is generally associated with an electronic circuit for processing the signals provided by the photoelectric elements to deliver an analog or digital signal representative of the image received by the sensor. This signal representative of the optical image received by the sensor preferably constitutes an electronic, digital, two-dimensional image, which can then be delivered to an image processing device and/or to a viewing device and/or to an image storage device (not represented).

Such a sensor 18, 18' is generally associated with an optical lens system 20, 20' which may include one or more optical elements, in particular one or more thin lens(es), and possibly a diaphragm, associated to allow the formation of an optical image of the installation area on the sensor. The optical lens system 20, 20', or at least a part thereof, and the sensor 18, 18' are generally part of the camera 19, 19'.

By "optical system" is meant according to the invention an observation system into which light rays coming from a lighted object enter to form a planar image.

According to the invention, it is considered that two optical systems 24, 24' are interposed optically, i.e. both in parallel between the installation area E for the container and the same common sensor 18, in the sense that the two optical systems 24, 24' form an image of the same object in the installation area on the same sensor 18, i.e. each between the installation area E for the container and an associated sensor 18, 18', in which case, the two optical systems 24, 24' each form an image of the same object in the installation area on the associated sensor 18, 18'. It is considered that there is for each image point, an upstream path downstream of the light rays starting from a source, reflecting on the object, then entering the optical observation system to be deflected therein by dioptric and/or catoptric optical elements, filtered (modification of their spectral composition or their polarization), intersected by a diaphragm, etc. in order to form an image of the object on the sensitive surface of the sensor. An element "optically interposed" between a first and a second other element therefore means that by following the path of the light rays contributing to the image, said element is located on said path downstream of the first element and upstream of the second element.

In the embodiments of FIG. 1A, 4, 5, 7A or 7B, the two optical systems are associated with the same common sensor 18. In this case, it is possible, notionally, to dissociate this single common sensor into two sensors, namely a first sensor associated with a first optical system 24 and a second sensor associated with a second optical system 24'. In reality, in this case, it will be possible to have a common sensor whose first part of the image capture surface, or first image formation area, is dedicated to the first optical system 24 and whose second part of the image capture surface, or second image formation area, is dedicated to the second optical system 24'. In this case, the first part of the common sensor forms a first sensor 18 and the second part of the common sensor forms the second sensor 18'.

Figure 3:
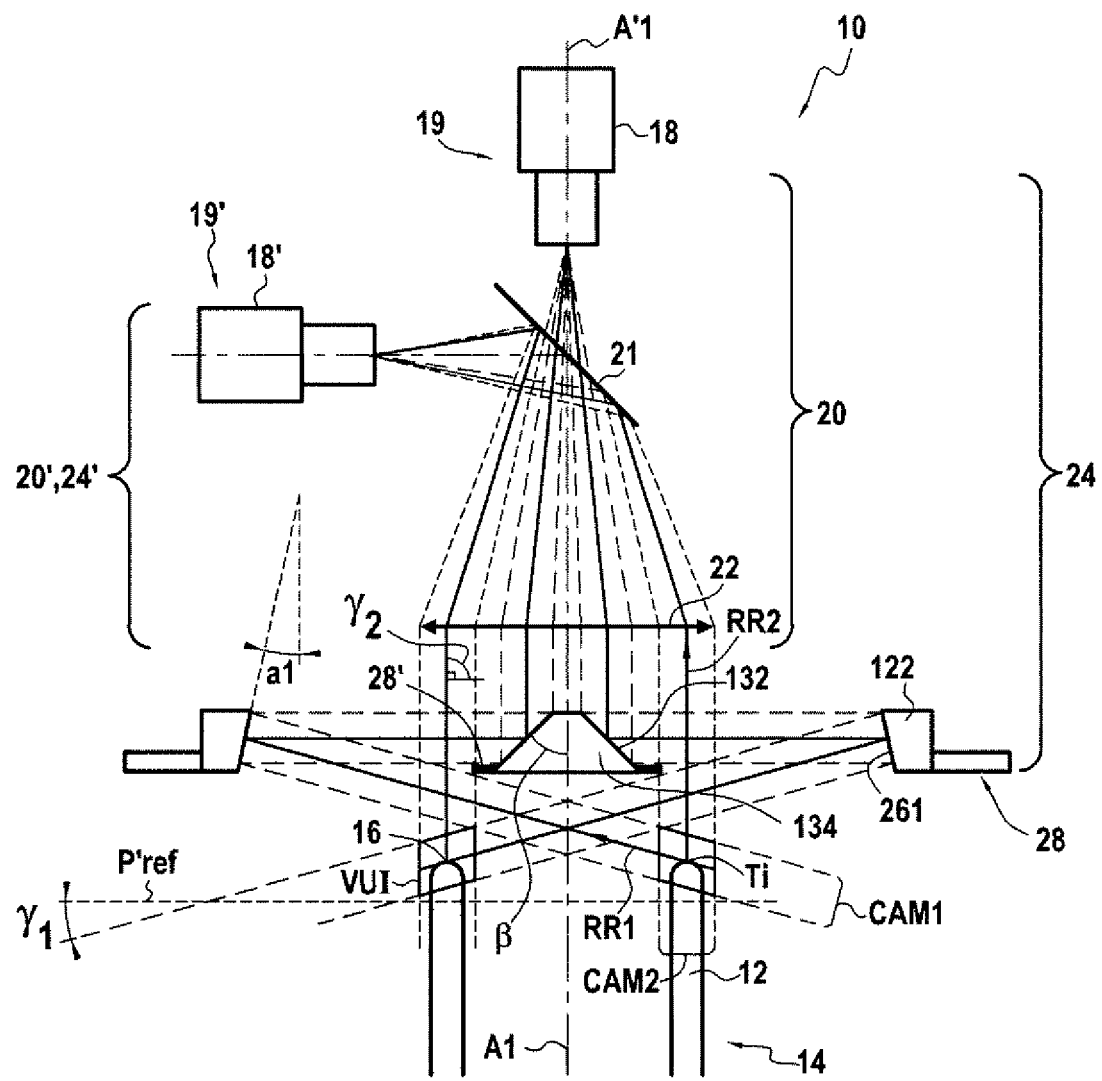
FIGS. 3, 4 and 5 are views similar to that FIG. 1 illustrating other embodiments of a device according to the invention.

In the embodiment of FIG. 3, the two optical systems 24, 24' are each associated with its own associated sensor, with a first optical system 24 associated with a first sensor 18, and a second optical system 24' associated with a second sensor 18'.

Each optical system 24, 24' defines, for the associated sensor, an upstream field-of-view in the installation area, defined as all the points of the installation area which are likely to be imaged by the optical system considered on the considered sensor. In this upstream field-of-view, the first and second optical systems 24, 24' define respectively, for the associated sensor, a first and a second peripheral observation field. It is arbitrarily considered here that the upstream and the downstream correspond to the upstream path downstream of a light ray coming from the installation area and moving in the direction of the associated sensor.

Each optical system 24, 24' can thus form on the associated sensor an image of the same ring surface 16 of a container 14 placed in the installation area E, each image being formed by the rays propagating from the ring surface according to the corresponding peripheral observation field.

In the exemplary embodiments, at least the first optical system 24 comprises, in addition to the optical lens system 20, at least one optical element 122, 261, which is here arranged between the lens system 20 and the installation area E. The entire first optical system 24 between the first sensor 18 and the installation area thus comprises the lens system 20 and the optical element(s) 122.

In the embodiments of FIGS. 1A, 5, 7A and 7B, the second optical system 24' comprises, in addition to an optical lens system 20', in this common case for the two optical systems 24, 24', at least one optical element 122, 262, which is here arranged between the lens system 20' and the installation area.

Figure 4:
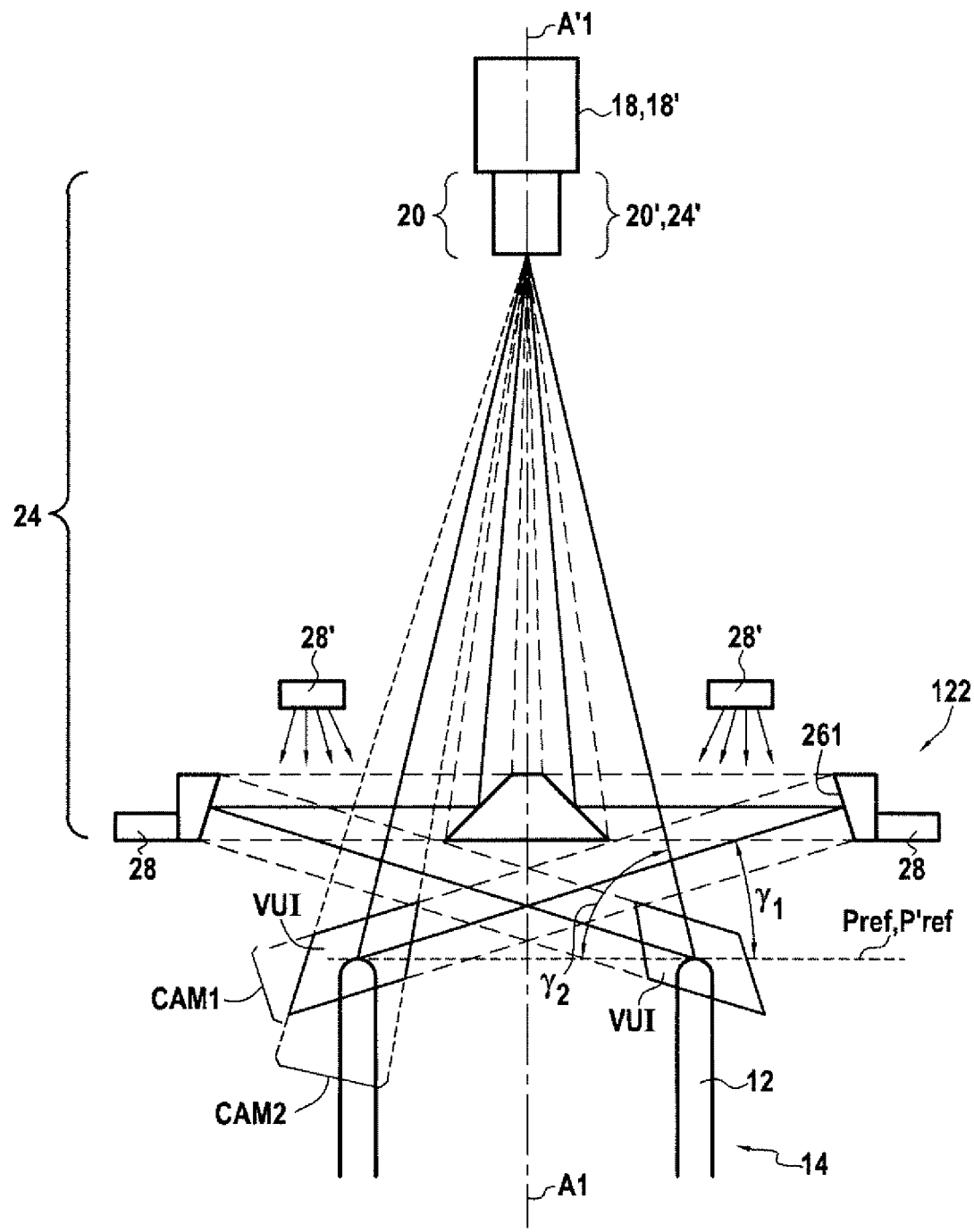

In the embodiments of FIGS. 3, 4, 7A and 7B, the second optical system 24' only comprises an optical lens system 20', with no reflection surface of revolution between the lens system 20' and the installation area. In the embodiment of FIG. 4, the second optical system 24' comprises an optical lens system 20 entirely common with that of the first optical system 24, 24'. In the embodiment of FIG. 3, the second optical system 24' comprises a second optical lens system

20' which is only partially common with the first optical lens system 20' of the first optical system 24. Thus, the example of FIG. 3 includes a first optical lens system 20 and a second optical lens system 20' which incorporate a common separation blade 21, which can be dichroic, arranged at 45 angle degrees on the installation axis A'1, to separate optical rays coming from the installation area into two parts. A first part of these optical rays is sent towards a first sensor 18, belonging in this example to a first camera 19, and another part is sent towards a second sensor 18', belonging in this example to a second camera 19'. In the example, the first and second lens systems 20, 20' have common elements, including for example a telecentricity lens and the separation blade 21, and elements specific to each of them, namely optical elements which are interposed between the separation blade 21 and the respective sensors 18, 18'. The focal distances of the lens systems 20 and 20' can be different.

In some of the illustrated examples, the optical lens system 20, 20' associated with either of the sensors 18, 18' is a telecentric lens system. A telecentric lens system is well known to those skilled in the art of the machine vision devices because it is used to form on the sensor an image which includes no or almost no parallax effect. In optical theory, a telecentric lens system is a lens system whose entrance pupil is positioned infinitely. It follows that such a lens observes in its field-of-view according to main observation rays which, through the associated optical system 24, 24', pass through the center of the entrance pupil CO of the lens system 20, 20', and which are parallel or almost parallel to the optical axis, hence the absence of parallax effect. However, the optical lens system 20, 20' is not necessarily telecentric, as illustrated by the embodiment of FIG. 4.

A sensor 18, 18' generally has a rectangular or square, therefore two-dimensional, shape so that it delivers a two-dimensional digital image representative of the two-dimensional optical image formed on the sensor by the optical lens system 20, 20'. The entire digital image delivered by such a sensor 18, 18' will be called overall image IG, IG'. It will be seen later that, in this overall digital image, only one or more image area(s) will be useful. Preferably, the overall image IG, IG' is acquired during a single integration time (also called exposure time) of the sensor. Alternatively, two acquisitions very close in time are made such that the article moves only insignificantly between the two acquisitions.

The optical axis of the lens system 20, 20' is preferably coincident with the installation axis A'1. In some cases, this optical axis is not straight, but segmented, for example by integration of a send-back mirror into the lens system or upon use of a separation blade 21. It is thus possible to provide a send-back mirror at 45 angle degrees with respect to the installation axis, thus with a first segment of the optical axis, on the sensor side, which would be arranged at 90 angle degrees with respect to the installation axis, and a second segment, on the other side of the send-back mirror, which would be arranged in line with the installation axis A1. Thus, in the example of FIG. 3 including a first and a second physically distinct sensors 18, 18', associated respectively with a first and a second optical system 20, 20', the second lens system 20' presents, due to the presence of a separation blade 21 which returns some of the light rays at 90 angle degrees in the direction of the second sensor 18', a downstream segment of optical axis, on the side of the second sensor 18', which is arranged at 90 angle degrees with respect to the installation axis A'1, and an upstream segment, on the other side of the separation blade 21, which is arranged in line with the installation axis A1. For the record, it is here considered arbitrarily that the upstream and downstream correspond to the upstream path downstream of a light ray coming from the installation area and moving in the direction of the associated sensor.

In the examples illustrated, the first optical system 20 is arranged vertically along the axis A'1, and it is turned downwards to observe the installation area E below the device, so to observe from above, i.e. from the top, a possible container 14 arranged in the installation area. The first photoelectric sensor 18, which in the embodiments of FIGS. 1A, 4, 5, 7A and 7B, is a common sensor associated with the two optical systems 24, 24', is therefore at the apex of the device 10 and it is turned downwards in the direction of the installation area E. With this disposition, it is understood that the theoretical ring surface of a container 14 placed in the installation area is therefore contained in a plane parallel to the plane of the sensor. This remains true for the example in FIG. 3 if the tilting of the optical axis which is induced by the presence of the separation blade 21 is considered. Thus, with a simple telecentric lens, without any other optical system, the image of the ring surface which would be formed on a single sensor would not allow to "see" unevenness. On the contrary, no height variation in this ring surface would be visible. This will however be implemented for the second optical system of FIG. 3.

In practice, the installation axis A'1 will be defined as being the extension in the installation area E of the optical axis of the first optical system 24.

According to another aspect of the invention, it is provided that the actual ring surface 16 of the container is lighted by means of at least a first peripheral incident light beam, that is to say extending to 360 angle degrees about the installation axis A'1. The ring surface is lighted from above, in the sense that first incident light rays arrive on the ring surface 16 coming from points located above the plane PRef perpendicular to the theoretical central axis A1 and tangent to a point of the ring surface, preferably the highest point along the direction of the theoretical central axis A1. The first light beam comprises, for a whole series of radial planes distributed at 360 angle degrees about the installation axis A'1, first incident radial light rays contained in these radial planes containing the installation axis. The radial rays are, at least for some of them, directed towards the installation axis A'1, as illustrated in FIG. 2. These first incident radial light rays are, at least for most of them, not perpendicular to this axis. The incident radial light rays are preferably non-parallel to each other and, in the method illustrated in FIG. 1A, the peripheral incident light beam comprises, in a given radial half-plane Pri (illustrated in FIG. 1B), containing the installation axis and delimited by the installation axis, non-parallel incident radial light rays. Thus, FIG. 1A illustrates that the first peripheral incident light beam may contain incident radial light rays which form an elevation angle, with a plane perpendicular to the installation axis, preferably comprised between 0 and 45 degrees. Preferably, the first light beam contains incident radial light rays in a continuous or substantially continuous angular range. This range can have an angular extent of at least 30 degrees or more. The rays contained in this range can form an elevation angle, with a plane perpendicular to the theoretical central axis, comprised between 5 and 40 degrees.

In addition to the first radial rays, the first peripheral incident light beam may also contain non-radial incident light rays.

In the illustrated embodiments, the device 10 includes at least a first lighting system intended to ensure the lighting of the ring surface according to the first peripheral incident light beam. It is thus the rays derived from this first lighting system that are reflected by the ring surface and collected at least by the first optical system according to at least the first observation field to be directed towards the first sensor 18. In the illustrated embodiments, this first lighting system includes a first light source 28 which is annular and the axis of which is the installation axis, and which is arranged above the installation area. The first light source 28 has a diameter greater than the diameter of the ring surface 16.

In the example illustrated, the diameter of the first annular light source 28 is greater than the diameter of the annular crown 122 which carries at least the primary reflection surface 261. In this embodiment, the light source 28 is arranged substantially at the same height along the direction of the installation axis A'1 as the lower primary reflection surface 261. However, this position is purely illustrative and could be adapted as a function of the diameter and of the axial position of the ring surface of the container to be inspected.

Note that FIG. 2 illustrates a variant of the embodiment of FIG. 1A which differs only in that the lighting system includes, in addition to the annular light source 28, a reflector 140 arranged just below the annular light source 28. This reflector 140 here includes a frustoconical surface, turned in the direction of the installation axis. The surface of the reflector 140 is flared upwards and therefore has a diameter substantially identical to that of the light source 28. It reflects substantially vertical rays, emitted by the light source 28, in the direction of the installation area, according to a grazing incidence, in the direction of the ring surface. Such a reflector makes it possible to concentrate the light emitted by the light source 28 in the direction of the ring surface, under a grazing incidence favorable for the embodiments which have a first grazing observation elevation angle, that is to say less than 25 angle degrees.

In the embodiment of FIG. 1A, and also for that of FIG. 7B, for which the first and second observation elevation angles differ by less than 20 angle degrees, the first light source 28 is the one that also provides the light intended to form the second image of the ring surface 16 through the second optical system 24'. However, in either case, it is possible to provide for the presence of a second light source dedicated to the formation of the second image of the ring surface 16 through the second optical system 24'.

Indeed, for the embodiments of FIGS. 3, 4, 5, and 7A, it is planned to provide a second lighting system, separate from the first one, and intended to ensure the lighting for the ring surface. It is thus at least mainly the rays derived from this second lighting system that are reflected by the ring surface 1.6 and that are collected according to the second observation field in the direction of the second sensor 18' or of the common sensor. This second lighting system includes a second light source 28' and is able to provide a second peripheral incident light beam, here distinct from the first one, comprising second incident radial light rays contained in radial planes containing the installation axis A'1 and distributed to 360 angle degrees about the installation axis A'1. They light the installation area, and therefore a ring surface 16 caused to be there, from the top.

Figure 5:
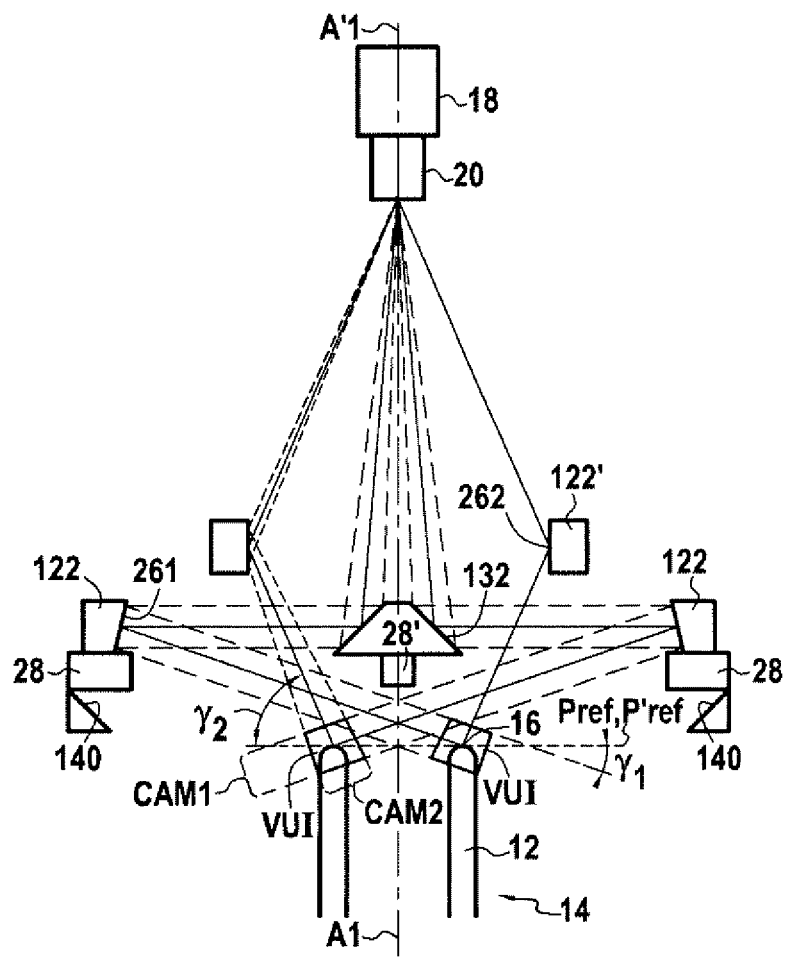

In the examples of FIGS. 3 and 5, said second incident radial light rays are directed so as to move away from the installation axis A'1 when followed from the second light source 28', which second light source 28' is, as in the other embodiments, arranged above the reference plane Pref of the ring surface 16.

In the embodiment of FIG. 3, the second light source 28' is annular and has the installation axis as its axis and it has a diameter which is slightly smaller than the diameter of the ring surface 16. Preferably, these two diameters will be very close, in order to have a direction of incidence of light rays derived from the second light source 28' close to 90° with respect to a reference plane perpendicular to the installation axis. In the embodiment of FIG. 5, the second light source 28' is a central source, which can be considered as a point source and placed on the installation axis A'1. It therefore also has a diameter which is smaller than the diameter of the ring surface 16. In this way, the ring surface 16 is lighted from the installation axis A'1, in other words, from inside.

FIG. 4 illustrates a possible variant for the second light source 28'. In such a variant, the light source 28' can be annular, can have the installation axis as its axis, and have a diameter which is greater than the diameter of the ring surface 16. It is also placed above the optical elements 122 and 132. In this case, it is noted that the second radial rays are directed towards the installation axis A'1 when followed from the second light source 28', which is arranged above the reference plane Pref of the ring surface 16. This variant is also implemented in the embodiment of FIG. 7A, and it can also be implemented as part of the embodiment of FIG. 3.

Preferably, for each observation field, it is provided that the incident beam lights the ring surface 16, from the top, at an incidence such that, at the point of reflection T' of an incident ray, whose ray reflected by the actual ring surface is seen by the associated sensor through the associated optical system, the normal "n" to the ring surface forms with respect to the axis A'1 an angle less than 30 angle degrees, preferably less than 10 angle degrees. Within the context of a perfect geometry, with an actual ring surface corresponding to the theoretical ring surface, it is thus ensured that the light reflected by the ring surface which is seen by the sensor 18 is the light which is reflected by the locally highest point, or close the highest local point of the ring surface. Only what is happening in a radial half-plane Pri of the device and of the ring surface to be controlled is considered here. Thus, the locally highest point of the ring surface is the point which, in the profile of the ring surface in this radial half-plane Pri, is the highest point along the direction of the installation axis. Furthermore, the locally highest point can be generally defined as being the one for which the normal to the ring surface is parallel to the installation axis. FIG. 2 illustrates an incident ray RI1 emitted by the light source, which is reflected by a point Ti of the ring surface at a first reflected ray RR1 which is intercepted by the first primary reflection surface 261 and thus sent towards the associated sensor. Another incident ray RI2 is reflected along a second ray RR2 reflected by the same point Ti of the ring surface at a second reflected ray which is intercepted by the second primary reflection surface 262 and thus sent towards the associated sensor. For the illustration, the normal "n" to the ring surface 16, at the point Ti, is substantially parallel to the direction of the installation axis, and the point Ti is the locally highest point of the ring surface profile in the corresponding radial half-plane. Within the context of the device, this condition will be fulfilled by selecting the appropriate position of the light source(s) 28, 28'. This position, which can be for example defined by the diameter of the annular source 28, 28', and by its height position along the direction of the installation axis A'1, indeed defines the angle of incidence of the rays which are likely to light the ring surface. Of course, the diameter and the height position of the actual ring surface 16 determine, in combination with the orientation of the normal to the point of reflection on the ring surface, which rays emitted by the source 28 are likely to be reflected in the direction of the sensor. It is therefore understood that for each ring surface diameter, it could be useful to adapt either the diameter of the annular source, or its height position relative to the ring surface 16. However, it is not necessarily critical to detect the locally highest point of the ring surface. Indeed, within the context of a planar and annular ring surface, the inner and outer radial edges of the ring surface have a ridge wherein, if the point of reflection of the incident light is located on this ridge, the height difference between the reflection point and the locally highest point will be in this case considered as insignificant. Within the context of a ring surface whose profile in the radial half-plane is rounded, it will also be considered that the fact that the reflection can be done on a point which is not the locally highest point, is largely compensated by the fact that this situation is repeated over the entire periphery at 360 angle degrees so that, from a point of view of the analysis of the evenness for example, the error thus made is generally considered as insignificant. Thus, it is certainly possible to provide a device in which the light source(s) would be adjustable, by adjustment of the radial position or of the position along the direction of the installation axis, to adjust the angle of incidence of the light beam on the ring surface. However, such a disposition is not mandatory. In order to best cover a wide range of ring surface diameter, it can be planned that the device is provided with several annular light sources, for example offset along the direction of the installation axis and/or of different diameter, these different light sources can be used simultaneously or alternatively depending on the diameter and shape of the ring surface of a container to be inspected. In practice, light sources are generally used which have, in a radial plane, an extent according to the radial direction and which emit a light beam containing radial rays at a continuous or substantially continuous angular range which can have an angular extent of at least 30 degrees or more. Such light sources, which have a radial extent and which are diffuse, make it possible to adequately light a whole series of containers having ring surfaces having a diameter, a profile and a height position which may differ in some ranges, without requiring position adaptation.

Note that, in particular in the embodiment of FIG. 1A, or in that of FIG. 7B, it will be advantageous to provide that the difference between the two observation elevation angles $\gamma 1$, $\gamma 2$ is less than or equal to 20 angle degrees, which will limit the errors that could be induced by reflections which, for the two images of the ring surface, would be made at different points of the ring surface which, while being in the same radial plane could be offset radially and axially from each other. This will be in particular advantageous insofar as it will promote the possibility of using a common light source for the observation according to the two observation elevation angles.

In the embodiments having a large difference between the observation elevation angles $\gamma 1$, $\gamma 2$, it will be preferably provided two distinct light sources 28, 28' arranged so that, in a given radial plane Pri, the first and second incident beams light the ring surface at an incidence such that the rays reflected by the actual ring surface 16 are seen through the two optical systems after reflection at the same point of the ring surface. But it can be accepted that the reflection points are different, because this can be taken into account in the processing of the images.

In the illustrated examples, for an optical system 24, 24', the sensor 18, 18', its lens system 20, 20', the optional optical element 122 and the installation area are aligned in this order along the same optical axis corresponding to the installation axis A'1.

In the illustrated examples, the optical peripheral vision element 122 includes at least a first primary reflection surface 261 belonging to the first optical system 24. In the example of FIG. 1A, the same optical element 122 includes a second primary reflection surface 262 belonging to the second optical system 24', so that the optical element 122 is common to the two optical systems, but by means of two different primary reflection surfaces. In the example of FIG. 5, a second distinct optical element 122' includes the second primary reflection surface 262 belonging to the second optical system 24'.

The first primary reflection surface 261 and, for the embodiments which provided with it, the second primary reflection surface 262, are arranged in a downstream field-of-view of the associated sensor 18, 18', that is to say in the portion of the field-of-view of the sensor which, in the examples illustrated, is defined by the associated lens system 20, 20'. The upstream field-of-view is therefore the one that is outside the associated optical system 24, 24', upstream thereof in the direction of circulation of the light from the installation area towards the associated sensor.

In the examples illustrated, the first primary reflection surface 261 and the possible second primary reflection surface 262 are frustoconical surfaces of revolution generated by rotation, each of its own generating line segment, about the same axis, here the installation axis A'1, and they are arranged to reflect light rays, coming from the ring surface, in the direction of the associated sensor, through the associated lens system 20, 20'. They have therefore specular reflection properties. They can be advantageously formed by a mirror, but they can also be made in the form of a prism, i.e. an optical diopter.

In the illustrated embodiments, the first primary reflection surface 261, and the possible second primary reflection surface 262, is a frustoconical surface of revolution, concave in a plane perpendicular to the installation axis A'1, which is turned towards the installation axis A'1, and which can for example be formed on an inner face of an annular crown, for example of the optical element 122, 122'. In this way, each primary reflection surface 261, 262 can return, directly or indirectly, in the direction of the installation axis A'1, light rays coming from the actual ring surface at a corresponding observation elevation angle $\gamma 1$, $\gamma 2$.

For a given peripheral observation field, the observation rays are the rays derived from the installation area E and likely to be received by the associated sensor 18, 18' through the associated optical system 24, 24'. Among these rays, the main observation rays are those which, through the associated optical system 24, 24', pass through the center of the entrance pupil CO of the lens system 20, 20'. The observation elevation angle of a main observation ray corresponds to the angle, with respect to a reference plane of the installation Pref' perpendicular to the installation axis A'1, of a main observation ray in the installation area where it is likely to affect the ring surface of a container to be inspected. It can be arbitrarily considered that the observation rays propagate from upstream to downstream starting from the observation area in the direction of the associated sensor 18, 18'.

Within the context of a device provided with a telecentric optical system, the main observation rays received by the sensor all enter the lens system 20, 20' in parallel. If in addition, as in some of the illustrated systems, the optical system includes as first optical element according to the upstream-downstream propagation of light from the installation area towards the associated sensor, a primary frustoconical reflection surface 261, 262 generated by a line segment, the observation elevation angle γ1, γ2 of the corresponding peripheral observation field is then a single angle for any main observation ray belonging to this given peripheral observation field, and it can be directly deduced from the inclination of the corresponding primary reflection surface 261, 262 with respect to the installation axis A'1. This angle is then considered as being the observation elevation angle γ1, γ2 of the peripheral observation field.

However, in some cases, in particular the case of a device having no telecentric lens system, the observation rays received by the sensor, including the main rays, may have observation elevation angles different relative to each other within a peripheral observation field determined by a given optical system 24, 24'. In this case, it can be assumed that the observation elevation angle of a peripheral observation field is the angle, measured in the installation area where it is likely to affect the ring surface of a container to be inspected, with respect to a plane perpendicular to the installation axis A'1, of a main average observation ray. The main average ray of a peripheral observation field is the one that presents an observation elevation angle which is the arithmetic mean of the minimum and maximum values of the observation elevation angles for the main rays of the considered field.

Preferably, in all the embodiments, the first and/or the second peripheral observation field is without azimuthal breakage about the installation axis A'1. In particular, there is no azimuthal angular discontinuity between two infinitely close observation radial rays angularly about the installation axis. In this way, there is no point breakage seen in the image generated by the considered field, which could make the image more difficult to interpret. For this, the first and/or the second primary reflection surface 261, 262 is preferably without discontinuity of curvature about the installation axis A'1, the curvature being analyzed in a plane perpendicular to the installation axis A'1, to ensure a field of observation without azimuthal breakage. The primary reflection surfaces 261, 262 are also preferably azimuthally continuous in the sense that they are continuously reflecting about the installation axis A'1, without masked angular sector, to ensure the azimuthal continuity of the observation field. However, in some cases, in particular due to hardware installation constraints, by the presence of a power cable, one or more angular sector(s), about the installation axis, may be masked. Preferably, such a masked azimuthal angular sector will be of small or very small extent, preferably less than 5 degrees about the installation axis.

The first and/or the second observation field(s) is/are peripheral in the sense that the corresponding observation radial rays are distributed in radial planes at 360 angle degrees about the installation axis A'1. In the examples, the first peripheral observation field is symmetrical in rotation about the installation axis A'1. Likewise, the second peripheral observation field is symmetrical in rotation about the installation axis A'1.

The first and/or the second peripheral observation field(s) observe(s) "from above" in the sense that the ring surface is observed from above a plane Pref perpendicular to the theoretical central axis A1 of the ring surface, and containing at least one point of the ring surface, for example the highest point along the direction of the theoretical central axis A1.

In the embodiments illustrated in FIGS. 1A to 5, the first optical system 24, possibly the second optical system 24', further includes, optically interposed between the optical element 122 and the lens system 20, a send-back reflection surface 132. Thus, as can be seen in FIG. 1A, the rays reflected by the two primary reflection surfaces 261, 262 are intercepted by the send-back reflection surface 132. The send-back reflection surface 132 is arranged in the downstream field-of-view of the sensor 18, this downstream field-of-view being defined by the optical lens system 20, 20'. In the example, this send-back reflection surface 132 includes a convex surface of revolution turned away from the installation axis A'1, so as to return the rays in the direction of the sensor. Preferably, the send-back reflection surface 132 is a convex frustoconical surface the axis of which is the installation axis A'1. The send-back reflection surface 132 is therefore formed on the outer surface of a truncated cone. In some embodiments, it has a small diameter and a large diameter which are both smaller than the diameter of the ring surface of a container to be controlled, but this characteristic is only compulsory for the embodiments for which the second optical system 24' to provide the second associated sensor 18' with a direct vision of the ring surface 16, as in the embodiments of FIGS. 3 and 4. The large diameter is arranged below the small diameter.

The send-back reflection surface 132 is part of the downstream field-of-view defined by the lens system 20 for the first sensor 18. In the embodiment of FIG. 1A, the send-back reflection surface 132 is also part of the downstream field-of-view defined by the lens system 20' for the second sensor 18', here the common sensor.

In the embodiments of FIGS. 1A to 5, the first primary reflection surface 261 and, for the embodiment of FIG. 1A, also the second primary reflection surface 262, while being a surface of revolution the axis of which is the installation axis A'1, is therefore arranged to indirectly reflect light rays, coming from the actual ring surface at respective observation elevation angles γ1, γ2, in the direction of the associated sensor 18, 18'. Indeed, the reflection on each of the primary reflection surfaces 261, 262 is indirect because followed by at least one reflection, here on the send-back reflection surface 132, before reaching the associated sensor 18, 18'.

In the exemplary embodiments of FIGS. 7A and 7B, the reflection, on the first primary reflection surface 261, of the light rays coming from the ring surface towards the associated sensor, is a direct reflection, with no other reflection surface between the ring surface 16 and the sensor 18 for a given light ray derived from the ring surface.

In the exemplary embodiment illustrated in FIG. 5, the reflection, on the second primary reflection surface 262, of the light rays coming from the ring surface towards the associated sensor, is a direct reflection, with no other reflection surface between the ring surface 16 and the sensor 18 for a given light ray derived from the ring surface.

In the case of an indirect reflection, it is advantageously provided that the trajectory of the main rays between each of the primary reflection surfaces 261, 262 and the send-back reflection surface 132 is perpendicular or substantially perpendicular to the installation axis. Such a disposition makes it possible to considerably reduce the sensitivity of the device to a possible defect in centering of the primary reflection surfaces 261, 262 or of the send-back reflection surface 132. For this, the frustoconical send-back reflection surface 132 has an apex half-angle of 45 angle degrees and it is arranged at the same height along the direction of the installation axis A'1 as the primary reflection surfaces 261, 262. Each primary reflection surface 261, 262 presents in this case an apex half-angle a1, a2 which is equal to half of the corresponding observation elevation angle γ1, γ2 desired for the considered primary reflection surface 261, 262. Thus, for a desired observation elevation angle γ1 of 15 angle degrees, the first primary reflection surface 261 has a conicity whose apex half-angle a2 is equal to 7.5 angle degrees, the first primary frustoconical reflection surface 261 being flared downwards, with its large diameter arranged below its small diameter along the direction of the installation axis. In this configuration, it is particularly advantageous that, in addition, the lens system 20, 20' is telecentric, so that the trajectory of all the main rays between each of the primary reflection surfaces 261, 262 and the send-back reflection surface 132 is perpendicular or substantially perpendicular to the installation axis A'1.

However, as a variant, still in the case of an indirect reflection, the send-back reflection surface 132 could be a frustoconical surface having an apex half-angle smaller than 45 angle degrees, for example equal to 45 angle degrees, minus an angle δ (delta). In this case, the send-back reflection surface 132 may be disposed above the level of the primary reflection surface(s) 261, 262, and the primary reflection surface(s) 261, 262 would then have an apex half-angle a1, a2 equal to half of the desired observation elevation angle γ1, γ2, minus the value of the angle δ (delta).

In the example of FIG. 1A, the first primary reflection surface 261 and the second primary reflection surface 262 are arranged to work both in indirect reflection jointly with a send-back reflection surface 132, and they are advantageously offset axially while being directly attached to each other along the direction of the installation axis, that is to say they are not arranged axially at the same level. Arbitrarily, it is considered that the primary reflection surface which is located below the other one along the direction of the installation axis A'1 is the first primary reflection surface 261, the second primary reflection surface 262 being then arranged above the first one. The two primary reflection surfaces can then have a common circular ridge corresponding to the lower edge of the upper surface, here the second primary reflection surface 262, and to the upper edge of the lower surface, here the first primary reflection surface 261.

However, the first primary reflection surface 261 and the second primary reflection surface 262 could be offset axially by being axially separated by a non-zero axial deviation between the lower edge of the upper surface and the upper edge of the lower surface, as in the example of FIG. 5.

In the illustrated embodiments, it can be seen that, with respect to the axis A1 of the ring surface, the observation made via a primary reflection surface is made peripherally radially from outside relative to the ring surface, in the sense that the first primary reflection surface 261, and moreover also the second primary reflection surface 262 for the embodiments of FIGS. 1A and 5, is arranged radially outside relative to the diameter of the ring surface 16.

It is noted however that for the embodiments of FIGS. 1A to 7A, an observation ray of the first observation field, coming from the ring surface 16, is intercepted by the first primary reflection surface 261 at a point diametrically opposite the point of origin on the ring surface, along a long path which intersects the installation axis A'1. Thus, it can be seen that the ring surface 16 is observed, according to at least the first observation field, through the side of its internal edge, that is to say the observation rays, in their trajectory from the ring surface towards the sensor, are directed towards the installation axis when they leave the ring surface 16 in the direction of the first primary reflection surface 261, and they intersect this installation axis A'1 before reaching the first primary reflection surface 261.

In the embodiment of FIG. 7B, the first optical system 24 defines an observation peripheral field radially from outside and observing the ring surface from the side of its external edge. Thus, a first observation ray coming from the ring surface 16 does not intersect the installation axis A'1 between the ring surface and the first optical system 24.

In the embodiment of FIG. 1A, the second optical system 24' defines, like the first one, a peripheral observation field radially from outside and observing the ring surface through the side of its internal edge, therefore according to observation rays which intersect the installation axis A'1 when the installation axis and the theoretical central axis A1 are coincident.

In the embodiment of FIG. 3, the second optical system 24', without reflection surface of revolution, therefore in telecentric direct vision defines, with respect to the theoretical central axis A1 of the ring surface, an observation perpendicular to the reference planes of the installation and of the ring surface.

In the embodiments of FIGS. 4, 7A and 7B, the second optical system 24', without a reflection surface of revolution, therefore in a non-telecentric direct vision, defines, with respect to the axis A1 of the ring surface, an observation radially from inside relative to the ring surface. However, in this embodiment of FIG. 4, the ring surface 16 is observed, according to the second observation field, through the side of its internal edge, as for the first embodiment.

In the embodiment of FIG. 5, the second optical system 24', defines a peripheral observation field radially from outside and observing the ring surface through the side of its external edge.

In the embodiments of FIGS. 3, 4, and 5, a second observation ray coming from the ring surface 16 does not intersect the installation axis A'1 between the ring surface and the second optical system 24'.

In all of the illustrated embodiments for which the optical system includes a primary reflection surface arranged for a direct or indirect reflection, the primary reflection surface has a small diameter and a large diameter both greater than the diameter of the theoretical ring surface, so that it defines a peripheral observation field radially from outside. In cases where the primary reflection surface is arranged for an indirect reflection, it is preferably flared in the direction of the installation axis towards the installation area. On the contrary, in the configurations of the embodiments of FIGS. 5, 7A and 7B, with an optical system 24, 24' including a primary reflection surface 261 and/or 262 which is arranged for a direct reflection towards the sensor, said primary reflection surface 261 and/or 262 can be flared in the direction of the installation axis towards the associated sensor, or be cylindrical of revolution about the installation axis A'1.

In the embodiments of FIGS. 1A to 5, the first peripheral observation field, defined for the first sensor or for the common sensor by the first optical system 24 including the first primary reflection surface, has, with respect to a plane PRef perpendicular to the installation axis A'1, a first observation elevation angle γ1, which is for example comprised between 5 and 25 angle degrees, for example 15 angle degrees. In the illustrated examples, the first peripheral observation field comprises the observation rays according to which incident light rays are reflected by the first primary reflection surface 261 towards the sensor 18. In other words, this first peripheral observation field constitutes a first upstream portion CAM1 of the field-of-view of the first sensor 18 through the first optical system 24, as determined by the first primary reflection surface 261, in the installation area E up to this first primary surface 261.

For the embodiments of FIGS. 7A and 7B, the first peripheral observation field, defined for the first sensor or for the common sensor by the first optical system 24 including the first primary reflection surface, has, with respect to a plane PRef perpendicular to the installation axis A'1, a first observation elevation angle γ1, which, for FIG. 7A, is comprised in the range from 25 to 45 angle degrees, and which, for FIG. 7B, is greater than 45 angle degrees.

For the embodiments of FIGS. 1A to 5, as well as that of FIG. 7A, in the upstream portion of the observation rays which is in the installation area E up to this first primary reflection surface 261, the first radial observation rays determined by the first optical system are first centripetal when followed from the ring surface, therefore oriented in the direction of the installation axis A'1, then intersect the installation axis A'1 to become, beyond the installation axis, centrifugal in the direction of the first primary reflection surface 261 of the first optical system, until affecting this first primary reflection surface 261.

For the embodiment of FIG. 7B, in direct reflection by the first primary reflection surface 261 without other reflection on a reflection surface of revolution, the first radial observation rays determined by the first optical system are, when followed from upstream to downstream from the ring surface in the direction of the sensor, centrifugal relative to the installation axis A'1, until affecting the first primary reflection surface 261 of the first optical system 24.

The second peripheral observation field has, with respect to a plane PRef perpendicular to the installation axis A'1, a second observation elevation angle γ2, which is for example comprised between 20 angle degrees and 90 angle degrees, this second angle being different from the first observation elevation angle γ1.

Preferably, the first and second observation elevation angles differ by at least 5 angle degrees. Indeed, such an angular difference appears necessary for good accuracy of the triangulation operations which will be described later. In the illustrated examples, but arbitrarily, the second observation elevation angle γ2 is strictly greater than the first observation elevation angle γ1.

In the examples illustrated in FIGS. 1A and 5, the second peripheral observation field comprises the observation rays according to which incident light rays are reflected on the second primary reflection surface 262, therefore through the second optical system 24', in the direction of the second sensor 18', in this case formed by the common sensor. This second peripheral observation field constitutes a second upstream portion CAM2 of the field-of-view of the common sensor 18, 18' through the second optical system 24', as determined by the second primary reflection surface 262, in the installation area E up to the second primary reflection surface 262.

For the embodiment of FIG. 1A, in the upstream portion of the second observation rays which is in the installation area E, up to this second surface 261, 262, the second radial observation rays determined by the second optical system are first centripetal when followed from upstream to downstream from the ring surface in the direction of the sensor, therefore first oriented in the direction of the installation axis A'1, then intersect the installation axis A'1 to become centrifugal beyond the installation axis A'1 in the direction of the second primary reflection surface 262 of the second optical system 24', until affecting the second primary reflection surface 262.

In the embodiment of FIG. 1A, the second observation elevation angle γ2 is, like the first observation elevation angle γ1, a grazing angle, less than 25 angle degrees.

In the embodiment of FIG. 5, in direct reflection by the second primary reflection surface 262 without any other reflection on a reflection surface of revolution, the second observation elevation angle γ2 is a downward angle, greater than 65 angle degrees, preferably greater than 75 angle degrees. For this embodiment of FIG. 5, the second radial observation rays determined by the second optical system are, when followed from upstream to downstream from the ring surface in the direction of the sensor, centrifugal with respect to the installation axis A'1, until affecting the second primary reflection surface 262 of the second optical system 24'.

It is noted that, in the embodiments of FIGS. 1A and 5 which have in common the presence of the second reflection surface 262 and the presence of a common sensor 18, the first primary reflection surface 261 and the second primary reflection surface 262 are each in disjoint portions of the downstream field-of-view of the common sensor 18, in the sense that they can be seen simultaneously by the sensor through the lens system 20, without masking each other. Insofar as the one would partially mask the other, for the one which is partially masked only the useful unmasked part will be considered.

In the embodiments of FIGS. 3 and 4, in direct vision without reflection on a reflection surface of revolution, the second observation elevation angle γ2 is also a downward angle, greater than 65 angle degrees, preferably greater than 75 angle degrees. In the embodiment of FIG. 3, the presence of a telecentric lens system means that the second observation elevation angle γ2 is equal to 90 angle degrees. Also in these two embodiments, this second peripheral observation field constitutes a second upstream portion CAM2 of the field-of-view, of the common sensor 18 for the embodiment of FIG. 4, or of the second sensor 18' for the embodiment of FIG. 3, through the second optical system as determined by the lens system 20'. In the portion of the observation rays which is in the installation area E up to the lens system 20', the observation rays of this second observation field are, for the embodiment of FIG. 4, centripetal towards the axis A'1 or, for the embodiment of FIG. 3, parallel to this axis, when they are followed from the installation area E towards the lens system 20'. It is noted that, in these embodiments not including a reflection surface of revolution for the second optical system 24', which is then reduced to the lens system 20', it can be considered that the upstream portion and the downstream portion of the field-of-view for the second sensor, distinct or common, are coincident.

It is therefore noted that the upstream portion of the second field-of-view is of annular section through a plane perpendicular to the installation axis A'1. In the two embodiments of FIGS. 3 and 4, the inner limit of this annular area is determined by the outer contour of the send-back surface 132, or even by the outer contour of the second annular light source 28' for the example of FIG. 3. Its outer limit is determined by the inner contour of the optical element 122, or by a possible second annular light source 28' in the embodiment of FIG. 4, or by the field limit of the associated sensor 18, 18'.

In the embodiment of FIG. 3, the second sensor 18' being a dedicated sensor, it is possible to provide for a specific positioning of the second sensor or a specific focusing of the second lens system 20', which allows taking into account the relatively significant path length difference for, on the one hand, the rays through the first optical system 24 and, on the other hand, the rays through the second optical system 24'. In the embodiment of FIG. 4, as in that of FIG. 5, comprising a common sensor 18 associated with the two optical systems 24, 24', the path difference can be compensated for example by increasing the depth of field, for example by means of a diaphragm, and/or by performing a mid-focusing of the lens system 20, and/or by using an additional dioptric or catoptric optical system interposed in either of the two optical systems 24, 24'.

In the embodiment of FIG. 7A, a first common light source 28 illuminates a point T of the ring surface 16 by means of radial incident light rays RI1 which are reflected into reflected rays RR1 for the first observation system whose first peripheral observation field defines a first observation elevation angle γ1 less than 45 angle degrees, but greater than or equal to 25 angle degrees, the reflected rays RR1 being, in the first area upstream of the field-of-view of the common sensor 18, centripetal in their course between the ring surface 16 and the installation axis A'1, to reflect in a centrifugal manner on the first primary frustoconical reflection surface 261 after having intersected the axis A'1. In FIG. 7A always, a second distinct light source 28' illuminates the same point T of the ring surface 16 by means of second radial incident light rays RI2 which are reflected into reflected rays RR2 for the second optical system 24' whose second peripheral observation field defines a second observation elevation angle γ2 distinct from the first angle, here greater than 45 angle degrees, for example greater than 65 angle degrees, even greater than 75 angle degrees, the reflected rays RR2 being, in the second upstream portion of the field-of-view, centripetal towards the installation axis A'1 in their course from the ring surface 16 in the direction of the second optical system 24' which is here limited to the lens 20'.

In FIG. 7B, a common single light source 28, annular about the installation axis A'1, illuminates the ring surface 16 by means of the incident rays RI1, RI2 which are reflected, at the same point T of the ring surface, respectively into reflected rays RR1 according to the first peripheral observation field, defined by the first optical system 24, and which here has a first observation elevation angle γ1 greater than 45°, the reflected rays being in the first portion upstream of the field-of-view, centrifugal in their course between the ring surface 16 and the first primary frustoconical reflection surface 261.

into reflected rays RR2 according to the second peripheral observation field, defined by the second optical system 24, and which here has a second observation elevation angle γ2, distinct from the first angle, here greater than 45°, for example greater than 65 angle degrees, or even greater than 75 angle degrees, the reflected rays RR2 being, in the second upstream portion of the field-of-view, centripetal towards the installation axis A'1 in their course from the ring surface in the direction of the second optical system 24' which is here limited to the lens 20'.

Note that, in the embodiments of FIGS. 7A and 7B, the two optical systems 24, 24' are non-telecentric. Alternatively, either or both of the two optical systems 24, 24' could be telecentric. Likewise, although illustrated with a common sensor, variants may be provided with distinct dedicated sensors.

It is therefore understood that all angle combinations are possible for the torque formed by the first elevation angle and by the second observation elevation angle, provided that these two angles differ, preferably by at least 5 angle degrees.

In all cases, the first and second optical systems are configured, relative to the associated sensor 18, 18', to determine respectively a first upstream field-of-view portion CAM1 and a second upstream field-of-view portion CAM2 which overlap, in the installation area E according to a useful volume of inspection VUI of revolution about the installation axis A'1. Thus, any point of an object located in the useful inspection volume, which is properly lighted, and which is imaged by a first image point in the first image formed by the first optical system on the first sensor, is also imaged by a second image point in the second image formed by the second optical system on the second sensor. This useful volume VUI, which forms a common inspection area, must have a geometry adapted to be able to receive the ring surface 16 of a container to be inspected. In the illustrated examples, this useful volume has a shape generated by the revolution, about the installation axis A'1, of a rhombus, this rhombus being possibly truncated, for example in the embodiment of FIG. 1A, depending on the depth of field determined by the optical systems 24, 24' for the associated sensors.

For the embodiment of FIG. 1A, this property is highlighted on the schematic graph in FIG. 1C. On this graph, the high and low limits of the first upstream field-of-view portion CAM1 and the high and low limits of the second upstream field-of-view portion CAM2 are represented in dashed lines in section in one half of a radial plane Pr. These two portions overlap according to the useful inspection volume VUI.

In all the embodiments, these two upstream field-of-view portions CAM1, CAM2 are each imaged, by the associated optical system 24, 24', respectively on a first area and on a second image forming area of the image sensor, said image forming areas of the sensor associated respectively with a first and a second image area of the overall image IG delivered in the sensor, this overall image therefore being common for the two optical systems in the example illustrated in FIG. 1D. This reasoning is made for the embodiments including a single common sensor associated with the two optical systems 24, 24'.

In the embodiments including two distinct dedicated sensors, one for each optical system, as illustrated in FIG. 3, it will be possible to ensure that a first overall image IG delivered by the first sensor, and a second overall image IG' delivered by the second sensor 18' includes in this way respectively a first image of the ring surface 16, in a first image area of the first overall image, and a second image of the ring surface 16, in a second image area of the second overall image. In this case, it should also be noted that it is possible to merge the two overall images, by computer, to obtain a composite overall image identical or similar to the common overall image obtained with a common sensor, provided that they are represented disjoint.

In the embodiments including a single common sensor associated with the two optical systems 24, 24', it will be noted that the first image area ZI1 and the second image area ZI2 are disjoint in the common overall digital image. The two optical systems simultaneously form, on the same two-dimensional sensor 18, two images separated in two distinct image-forming areas of the sensor, such that the latter delivers an overall image comprising two distinct image areas, each distinct image area including an image of the ring surface from the rays collected according to the peripheral observation field having the observation elevation angle determined by the corresponding primary reflection surface. Thus, this allows the simultaneous formation, from the reflected rays collected according to the first and second peripheral observation fields, via the optical systems 24, 24', of a two-dimensional image I161, I162 of the ring surface of the container both in the first image area ZI1 corresponding to the observation according to the first peripheral observation field having the first observation elevation angle γ1 and in the second image area ZI2 corresponding to the observation according to the second peripheral observation field having the second observation elevation angle γ2. In this case, there will be therefore, for each container, an overall image including two image areas each including an image of the ring surface, from two different observation elevation angles. This common overall image IG is preferably acquired during a single acquisition time of the image sensor 18. In the case of two sensors, the two overall images can advantageously be acquired simultaneously. However, it can on the contrary be provided that the first ring surface image and the second ring surface image are acquired at distinct times.

The images of the ring surface I161, I162 are formed by the radial rays of the corresponding incident light beam which are reflected by specular reflection on the ring surface 16 and directed by the corresponding optical system 24, 24', on the associated sensor 18, 18'. In some embodiments, it will be considered that the image I161, I162 of the actual ring surface consists only of these radial rays of the corresponding incident light beam which are reflected by specular reflection on the ring surface 16 and directed by the corresponding optical system 24, 24', on the associated sensor 18.

In some embodiments, in particular those including two distinct dedicated sensors and two distinct light sources, with a sensor and a light source dedicated for each optical system, as illustrated in FIG. 3, it will be possible to ensure that each overall image includes only an image of the ring surface. Indeed, it can be provided a first light source 28 emitting in a first range of wavelengths and a second light source 28' emitting in a second range of wavelengths, distinct from the first range. In some embodiments, two ranges of wavelengths which do not overlap will be chosen. It is therefore sufficient, in the formation of the first image and of the second image of the ring surface, to carry out a chromatic filtering so that each image is formed with the reflected rays derived from the corresponding light source. This chromatic filtering can be carried out for example in the form of a chromatic optical filter in the optical path through one or both of the optical systems 24, 24'. In the embodiment of FIG. 3, including two distinct sensors 18, 18' and a separation blade 21, it is possible to provide that the separation blade is a dichroic blade. The chromatic filtering can be carried out at the sensor(s), using sensors operating in different chromatic ranges or using, in the processing of the signal collected by the sensor, only part of the collected light signal. In a system including a single common, for example tri-chromic (Tri CCD or of the Bayer type), sensor, it is for example possible to use only one chromatic channel for the first image area and another chromatic channel for the second image area. This can make it easier to identify the image of the ring surface in the corresponding image. This in particular makes it possible to at least partially compensate for any stray reflections, including those due to the possible presence of the two light sources within the device.

Advantageously, each of the two optical systems 24, 24' allows the optical formation of a two-dimensional image I161, I162 of the complete and continuous ring surface at 360 angle degrees about the theoretical central axis A1 of the ring surface 16 on the associated sensor 18, 18'. This complete and continuous optical image is formed on the associated sensor without digital transformation, only by an optical method acting on the light. In the illustrated examples, this complete and continuous optical image of the ring surface is formed on the sensor by the optical system 24, 24', without digital transformation.

FIG. 1D represents an example of a common overall image or of a composite overall image obtained as described above. Through each optical system 24, 24', two planar optical images I161, I162 of the actual ring surface 16 were thus obtained on the associated sensor, by means of two optical geometric transformations which each convert the ring surface 16 into a ring surface image I161, I162. Preferably, for each of the optical geometric transformations, the relative angular positioning of two points of the ring surface about the theoretical central axis A1 is not modified, in the sense that the respective images of two points of the actual ring surface, separated by an angular deviation about the theoretical central axis A1, are separated, in the image obtained by the considered optical geometric transformation, by the same angular deviation around the image of the theoretical central axis. For each of the two optical transformations, it is considered that the same transformation theoretically converts the theoretical ring surface into a theoretical ring surface image I161$t$, I162$t$, in the sense that the theoretical ring surface image is the image, which would be formed by the transformation, of an actual ring surface which would be coincident with the theoretical ring surface.

In FIG. 1C, the trajectory of two observation rays has been illustrated in solid line, respectively according to the first observation elevation angle and according to the second observation elevation angle, derived from the point Ti of the actual ring surface, in the direction of the photoelectric sensor 18, passing respectively through the first and the second primary reflection surfaces.

FIG. 1D illustrates the overall image IG as received by the sensor 18 through the two optical systems 24, 24'. The two actual images of the same ring surface, formed respectively according to the two observation elevation angles, therefore respectively via the two primary reflection surfaces 261, 262, are here illustrated each in the form of a image line I161, I162 which is the image, formed by the corresponding optical system on the common sensor 18, of the reflection of the corresponding incident beam on the ring surface 16. The thickness of these two image lines according to the radial direction in the overall image IG is determined for example in particular by the planar, rounded, inverted V-shaped or polygonal geometry of the profile of the ring surface in section in a radial plane, by the extent of the light source in the same radial plane, and by the angle of the light range delivered by this source. In most cases, an image of the ring surface I161, I162 can be assimilated to a line, otherwise it will be possible to define a line representative of the image of the ring surface, for example choosing an internal or external edge line or a mid-line of the image of the ring surface as a representative line. Such a line can also be determined by segmentation, by "skeletonization", by looking for a particular point for each traveled ray starting from the center, etc.

As illustrated in FIGS. 1C and 1D, it is considered here that the corresponding point Tti of the theoretical ring surface 16$t$ is the point of this theoretical surface which would have the same angular coordinate as the considered point Ti of the actual ring surface 16 in a system of cylindrical coordinates (Z, ρ, Θ) centered on the theoretical central axis A1. The position difference between a considered point Ti of the actual ring surface and a corresponding point Tti of the theoretical ring surface is the combination of an actual height difference dZ, along the direction of the theoretical central axis, and of an actual radial difference dρ, along the radial direction perpendicular to the theoretical central axis A1.

The image points ITi1, ITi2 of the ring surface image of the container are the images of the considered point Ti of the actual ring surface through respectively the first and second optical systems, due to the corresponding optical geometric transformation.

In this FIG. 1D, two lines I161t, I162t have been added, illustrating respectively the theoretical ring surface image according to the two observation elevation angles. The corresponding theoretical image points ITti1, ITti2 of the theoretical images I161t, I162t of the ring surface 16t are the images of the corresponding point Tti of the theoretical ring surface through respectively the first and the second optical system, due to the corresponding optical geometric transformation.

A theoretical line I161t, I162t representative of the theoretical ring surface image can be a predefined line, for example a circle centered on the image of the installation axis IA'1.

Alternatively, a theoretical line I161t, I162t representative of the theoretical ring surface image can be deduced from the image of the ring surface I161, I162, for example by calculation within an image processing device, by estimating the corresponding theoretical line I161t, I162t. Different methods are possible to deduce this theoretical line, for example of the type "best fit curve", Hough transform, correlation, search for the largest inscribed circle, etc. In these methods it is possible to take into account values of the diameter a priori of the ring. Indeed, the theoretical line I161t, I162t in a perfect optical system and for a container centered in the installation area E (A1=A'1) is a circle. The diameter of the circle of a theoretical ring image (theoretical line I161t, I162t) can be known a priori from the image processing system, using adjustment or initialization means, for example by learning, or by entering or downloading a value. Therefore, to know the theoretical line I161t, I162t, its center needs to be determined from the image of the ring surface I161, I162. It is possible to generalize these methods with more elaborate shapes of theoretical curves like ellipses, or other parametric curves for non-centered containers, therefore if A1 is offset from A'1.

The two digital image areas ZI1, ZI2, each containing respectively one of the two images of the same ring surface are, in the example illustrated, concentric annular areas which correspond respectively to the two primary reflection surfaces 261, 262.

As illustrated in FIGS. 1C and 1D, at least one of the two optical geometric transformations and, at least for the embodiments of FIGS. 1A, 3, 4 and 5, in reality the two optical geometric transformations, converts, except in special cases, a position difference between a considered point Ti of the actual ring surface and a corresponding point Tti of the theoretical ring surface, into a radial image offset dR1$i$, dR2$i$. A radial image offset dR1$i$, dR2$i$, in the overall image IG, IG', is the distance between, on the one hand, the image point ITi1, ITi2 in the corresponding actual ring surface image I161, I162 and, on the other hand, the corresponding theoretical image point ITti1, ITti2 in the corresponding theoretical ring surface image I161t, I162t.

In the example illustrated, the two actual ring surface images I161, I162, illustrated in solid line, are substantially coincident over the entire periphery with the corresponding theoretical ring image I161t, I162t, which are illustrated in broken line. It can be seen that, in the first image area ZI1, in the angular sector corresponding to the point Ti of the ring surface having a localized defect, the first actual ring surface image I161 stands out from the first corresponding theoretical ring image I161t, and has, in the image, a radial image offset dR1$i$ relative to this image. It is seen that the position difference between the two points Ti and Tti is converted according to the first optical geometric transformation, due to the optical system 124, into a radial image offset dR1$i$ on the image seen by the sensor.

In the illustrated example, for which the second observation elevation angle γ2 is also a grazing angle, it is seen that, in the angular sector corresponding to the same point Ti of the ring surface having a localized defect, the second actual ring surface image I162 also stands out from the second corresponding theoretical ring image I162t and has, in the image, a radial image offset dR2$i$ relative to this image. It is seen that, in this hypothesis, the position difference is converted according to the second optical geometric transformation, due to the optical system 124, into a second radial image offset dR2$i$ on the image seen by the sensor.

It is noted that, for the configurations in which the reflected rays undergo the same number of reflections, or a number of the same parity, in their path between the actual ring surface and the sensor 18, the two radial image offsets dR1$i$ and dR2$i$ can be measured, in the overall image IG delivered per sensor, on the same ray derived from a central point of the image which corresponds to the image IA'1 of the installation axis A'1.

Preferably, for at least the first of the two optical geometric transformations, for example the one implemented through the first reflection surface 261, it is observed, in the first planar image area ZI1 collected by the first sensor 18, that the radial image offset dR1$i$ resulting from a unit actual height difference dZi is greater than the radial image offset resulting from an actual radial offset dρi of the same dimension between a considered point of the actual ring surface and a corresponding point of the theoretical ring surface. In other words, preferably, for at least the first of the two optical geometric transformations, the influence of an actual height difference dZi is greater than the influence of an actual radial difference dρi in the radial image offset obtained in the first optical geometric transformation obtained by the first optical system 24. Thus, a height offset of 1 mm of the actual ring surface relative to the theoretical ring surface would result in a radial image offset of axial origin, while a radial offset of 1 mm of the actual ring surface relative to the theoretical ring surface would result in another radial image offset, of radial origin, of lower value.

In some embodiments of a device of the invention, such a preponderance of the radial image offsets of axial origin is ensured by the fact that the first observation elevation angle is less than or equal to 45° angle degrees, even more if it is less than 25 angle degrees. However, in the embodiment of FIG. 7B, such preponderance is not provided for any of the two geometric transformations defined by the two optical systems 24, 24'. In the illustrated exemplary embodiments including a first frustoconical primary reflection surface 261 concave in a plane perpendicular to the installation axis, this property, according to which the influence of an actual height difference is greater than the influence of an actual radial difference in the radial image offset obtained in the optical geometric transformation, is ensured in particular by the angle of the primary reflection surface 261 with respect to the installation axis A1. More specifically, the apex half-angle a1, characteristic of the primary reflection surface 261, determines the influence ratio, on the radial image offset, between a height difference and a radial difference in the actual surface relative to the theoretical ring surface.

In the embodiments illustrated, with a first concave primary reflection surface 261 and a send-back reflection surface 132, the more this apex half-angle a1 of the primary reflection surface 261 decreases as it approaches 0 angle degrees, the greater the influence of the height difference on the radial image offset. Of course, it will be preferably ensured that the apex of the cone which carries the primary reflection surface is disposed upwards relative to said surface, so that the optical element 122 which carries the primary reflection surface 261, 262 can be arranged above the ring surface 16, the sensor 18 thus seeing the ring surface 16 from above through the optical system 24. In the illustrated case where the send-back reflection surface 132 has an angle of 45 angle degrees, this apex half-angle a1 is less than 12.5 angle degrees so that the influence of the actual height difference is very much greater than the influence of an actual radial offset in the radial image offset.

Preferably, for at least the first of the two peripheral observation fields, the radial image offset corresponding to a unit actual height difference is at least 2.14 times greater, and more preferably at least 3 times greater than the radial image offset corresponding to an actual radial offset of the same dimension between said point of the actual ring surface and a corresponding point of the theoretical ring surface. In this way, it is ensured that, in the image obtained, a radial image offset is very largely due to a height offset of the actual ring surface relative to the theoretical ring surface rather than to a radial offset between these two surfaces.

In the examples illustrated in FIGS. 1A to 5, the observation elevation angle γ1 defined by the first primary reflection surface 261 is of 15 angle degrees, and the apex half-angle a1 of the first primary reflection surface 261 is of 7.5 angle degrees. More generally, in the configuration of the device of FIG. 1A, the first primary concave reflection surface 261 can be a frustoconical surface of revolution, continuous at 360 angle degrees about the installation axis A1, and having an apex half-angle a1 equal to half of the observation elevation angle.

In the configuration of the device of FIG. 1A, the second observation elevation angle γ2 also is less than 45 angle degrees, and even preferably less than 25 angle degrees, and is therefore a grazing angle, as seen above. It appears that there is also, in the second image I162 of the ring surface, a radial image offset dR2 corresponding to a unit actual height difference greater than the radial image offset corresponding to an actual radial offset of the same dimension between said point of the actual ring surface 16 and a corresponding point of the theoretical ring surface 16*t*.

On the contrary, in the embodiments of FIGS. 4, 5, 7A and 7B, the second observation elevation angle γ2 is not a grazing angle, as seen above. It can be for example greater than 65 angle degrees, or even greater than 75 angle degrees. In this case, a radial image offset is very largely due to an actual radial offset dρ of the actual ring surface relative to the theoretical ring surface rather than to a height offset between these two surfaces. This radial image offset for the second image is therefore mainly of radial origin.

For the embodiment of FIG. 3, the second observation elevation angle γ2 is of 90 angle degrees. In this case, a radial image offset dR2 is only due to an actual radial offset dρ of the actual ring surface relative to the theoretical ring surface. A height offset dZi between these two surfaces is not visible on the second ring surface image. In other words, in this device of FIG. 3, a radial image offset dR2*i* measured in the second ring surface image I162 directly gives a value representative of a radial offset of the actual ring surface relative to the theoretical ring surface along a direction perpendicular to the installation axis.

Possible methods for processing an image and determining measurements for the inspection of the containers are explained in the following description. In order for the measurements made in pixel or sub-pixel units in the images to be translated into physical measurements relating to containers, in particular in length units, the calculations take into account the optical and geometric characteristics of the first and second optical systems 24, 24', including lens systems 20, 20', and sensors 18 and 18' such as: the dimensions of the pixels, the focal lengths of the lenses, the distances and positions of the optical elements and of the ring surface, and the angles of the frustoconical mirrors, etc. These optical and geometric characteristics are therefore considered to be known to the image processing system. They are made available to the image processing system either by any storage medium, for example by input or by calibration of the device.

These optical and geometric characteristics are also used to calculate geometric rays corresponding to optical rays in order to perform any useful calculation in the three-dimensional measurement space.

Thus, more generally, in the images which are obtained by the method and/or the device described above, it is possible to carry out, by image processing, the determination of points of interest of each ring image. These determinations will be made for a number N of analyzed directions Di, derived from a reference point O of the overall digital image and angularly offset from each other around the reference point O, which will be preferably the image IA'1 of the installation axis.

It is noted that it is then possible to work in a common overall digital image delivered in the case of a common sensor or, in the case of two dedicated sensors, in a composite overall digital image obtained by composition of the two overall digital images delivered separately by two delivered dedicated sensors, or separately in the two delivered overall digital images separately by two dedicated sensors. In all cases, it will be ensured to take account of any optical inversion between the two two-dimensional digital images, any magnification difference between the two images, any orientation difference, even if it means readjusting the two images if necessary so that they are geometrically comparable.

Thus, it will be possible to determine, according to the analyzed direction Di, a first image point ITi1 of the first two-dimensional digital image I161 of the ring surface 16, on the analyzed direction. This image point ITi1 is the image of the point Ti of the ring surface through the first optical system. It is then possible to determine a first value representative of the distance from this first image point to the reference point in the first overall digital image IG. In the example mentioned above, this representative value can be the value of the first radial image offset dR1*i*, i.e. the distance between the first image point ITi1 and a first theoretical image point ITti1, belonging to the first theoretical ring surface image I161*t* and located in the same direction. This first radial image offset dR1*i* is therefore, in this example, the distance, along the analyzed direction, derived from the reference point, between the line I161 representative of the first image of the ring surface 16 and the theoretical line I161*t* representative of the theoretical ring surface image in the first image. However, it is also possible to take, as a representative value, the value of the distance from this first image point to the reference point in the first overall digital image IG as will be described later.

It is also possible to determine a second image point ITi2 of the second image I162 of the ring surface 16, on the same analyzed direction Di derived from the reference point IA1, IA'1. This image point ITi2 is the image of the same point Ti of the ring surface through the second optical system 24'. It is then possible to determine a value representative of the distance from this second image point ITi2 to the reference point IA1, IA'1 in the second overall digital image IG'. In the example mentioned above, this representative value can be the value of the second radial image offset dR2$i$, always for the same analyzed direction Di, i.e. the distance between the second image point ITi2 and a second theoretical image point ITti2, belonging to the second theoretical ring surface image I162$t$ and located in the same direction. This second radial image offset dR2$i$ is therefore, in this example, the distance, according to the analyzed direction, derived from the reference point IA1, IA'1, between the line I162 representative of the second image of the ring surface 16 and the theoretical line I162$t$ representative of the theoretical ring surface image in the second image. However, as will be seen with reference to FIG. 1E, it is also possible to take, as a representative value, the value of the distance from this second image point to the reference point in the second overall digital image IG.

Of course, for the two images, values representative of the same magnitude will be taken.

On this basis, it is then possible to deduce, for each analyzed direction Di, by a geometric triangulation relation in the radial plane Pri, at least one value representative of an axial position, along the direction of the installation axis A'1, from the point Ti of the actual ring surface 16 whose images by the first and second optical systems 24, 24' are respectively the first image point ITi1 and the second image point ITi2.

Referring to FIG. 1D, this geometric triangulation relation uses for example:
  the first value, for example the first radial image offset dR1$i$;
  the second value, for example the second radial image offset dR2$i$;
  the first observation elevation angle γ1, and
  the second observation elevation angle γ2.

Indeed, by orthogonal projection in a radial plane Pri containing the installation axis A'1 and passing through the considered point Ti, therefore containing the analyzed direction Di, it is possible to determine relations connecting:
  an actual radial offset dρ$i$ between the points Ti and Tti considered in the radial plane Pri containing them;
  a height difference dZ$i$ along the direction of the installation axis between the considered points Ti and Tti
  the radial image offsets dR1$i$ and dR2$i$ measured in the overall image.

In the exemplary embodiment illustrated, this relation can be described by the equations:

$$dR1i = dZi*G1*\cos(\gamma 1) + d\rho i*G1*\sin(\gamma 1)$$

$$dR2i = dZi*G2*\cos(\gamma 2) + d\rho i*G2*\sin(\gamma 2)$$

where G1 and G2 are functions of the magnification respectively of the first lens system 20 and of the second lens system 20'.

Alternatively, with reference to FIG. 1E, it will be possible to determine, according to the analyzed direction Di, a first image point ITi1 of the first two-dimensional digital image I161 of the ring surface 16, on the analyzed direction. This image point ITi1 is the image of the point Ti of the ring surface through the first optical system. It is then possible to determine the distance R1$i$ from this first image point to the reference point O, for example the image IA'1 of the installation axis, in the first overall digital image IG. This value can be called radial image coordinate R1$i$.

It is also possible to determine a second image point ITi2 from the second image I162 of the ring surface 16, on the same analyzed direction Di derived from the reference point O. This image point ITi2 is the image of the same point Ti of the ring surface through the second optical system 24'. It is then possible to determine the distance R2$i$ from this second image point ITi2 to the reference point O in the second overall digital image IG'. This value can be called radial image coordinate R2$i$.

On this basis, it is then possible to deduce, for each analyzed direction Di, by a geometric triangulation relation in the plane Pri, at least one value Zi representative of an axial position, along the direction of the installation axis A'1, and a value ρ$i$ representative of a radial position of the point Ti of the actual ring surface 16 whose images by the first and the second optical system 24, 24' are respectively the first image point ITi1 and the second image point ITi2.

This geometric triangulation relation uses for example:
  the first value, the radial image coordinate R1$i$ of the first image point ITi1;
  the second value, the radial image coordinate R2$i$ of the first image point ITi2;
  the first observation elevation angle γ1, and
  the second observation elevation angle γ2.

Indeed, by orthogonal projection in a radial plane Pri containing the installation axis A1 and passing through the considered point Ti, therefore containing the analyzed direction Di, it is possible to determine relations connecting:
  the radial position ρ$i$ of the point Ti with respect to the installation axis A'1 in the radial plane Pri containing them;
  the axial position Zi along the direction of the installation axis A'1 for the point Ti.

$$R1i = Zi*K11*\cos(\gamma 1) + \rho i*K12*\sin(\gamma 1) + K13$$

$$R2i = Zi*K21*\cos(\gamma 2) + \rho i*K22*\sin(\gamma 2) + K23$$

wherein Kij are constants depending on the geometrical and optical characteristics of the device, as described above.

For all directions Di, therefore for all the planes Pri therefore for all the angles θi, the complete cylindrical coordinates of a point Ti of the ring surface are thus known.

An equivalent method is to calculate, in a given radial plane Pri, for the image points IT1$i$ and IT2$i$, the associated main observation ray, and to consider the position of the point Ti as being the intersection of the two main observation rays thus calculated. Indeed, by knowing the optical and geometric characteristics of the device, it is possible to associate with each image point of an image, a main observation ray for this point of the image. Thus, the two image points IT1$i$ and IT2$i$ corresponding to the same actual point make it possible to determine the equation of two main observation rays, therefore each having a different observation elevation angle. Such a method remains based on a geometric triangulation relation using a first value representative of the distance from the first image point to the reference point, a value representative of the distance from the second image point to the reference point, the first observation elevation angle γ1, and the second observation elevation angle γ2.

According to a variant, one of the two images I161 (respectively I162) of the ring surface can be analyzed by considering together the N image points IT1$i$ (respectively IT2$i$) to obtain an estimate of one of the two values, either of the actual radial offset dρ$i$, or of the height difference dZ$i$. For example, from the N points IT2$i$ of the second image I162, an estimate, for each direction, of the actual radial offset dρ$i$, is determined. This estimate of the actual radial offset dρi is then taken into account to correct estimates of height difference dZi only from the points IT1$i$.

According to a variant, the second image I162 is obtained with a device like those of FIG. 3 or 4, with a downward observation elevation angle, in particular greater than 75 angle degrees, in which the influence of the actual height difference dZi, on the radial position of the second image point or on the radial image offset dR2$i$, is insignificant or even zero if γ2=90 angle degrees. In this case, it is possible to first analyze the second image I162 of the ring surface by considering together the N points IT2$i$. From the N points IT2$i$ of the second image I162, values representative of the off-centering and/or of the roundness are determined, for example the actual radial offset values dρi. In a second step, these values determining the shape and position of the cylinder of the ring, it is possible to determine with great accuracy the position dZi of each actual object point Ti from the position of the image point IT1$i$.

Indeed, in general, it is considered that an actual radial offset dρi of a point Ti of the ring surface may be due:

a) to the off-centering of the theoretical central axis A1 of the ring with respect to the axis A'1 of the installation during shooting.
b) to a defect in roundness.

The following explanation neglects the influence of a possible inclination, which can however be taken into account elsewhere.

In all cases, for the first image obtained after reflection on a primary reflection surface, in the absence of any defect in roundness but in the presence of an off-centering, the first actual ring surface image I161 is a parametric curve, resulting from the observation of a circle through its reflection on the frustoconical mirrors. In the absence of off-centering, this first image is a circle.

On the contrary, in the absence of any defect in roundness, the actual ring surface image I162 is a circle centered or not for the embodiment of FIG. 3 and an ellipse for the embodiment of FIG. 4. It is easy to determine a circle or an ellipse in the image area ZI2 by means of known algorithms and therefore to know the off-centering. It is possible to define therefrom a measurement in the image frame in pixels or in the actual frame in millimeters of the distance between the axes A1 and A'1.

For the embodiments of FIGS. 3 and 4, the defects in roundness are then the deviations between the theoretical curves and the actual curves. A defect in roundness is then determined for example by looking for the second theoretical line I162$t$ of the circle or ellipse type most closely approaching the actual curve I162. An algorithm similar to the previous one is therefore applied. For the embodiments of FIGS. 3 and 4, the defects in roundness are then the deviations between the theoretical curves and the actual curves. It is possible to define therefrom, in the image frame in pixels or in the actual frame in millimeters, measurements, and compare these measurements with tolerance thresholds. An example of measurement is given by the area surface comprised between the two compared curves, or a distance value between these curves. Other criteria are possible. These are in any case values representative of the distance from image points to reference point in the corresponding digital image.

In general, the method for analyzing the images IG, IG' by the image processing system, for the determination of a three-dimensional geometry of an actual ring surface of a container, takes into account the optical and geometric characteristics of the device. In the image IG, IG', a reference point is selected as the origin O of an image frame of polar coordinates. Preferably this origin is the point IA'1 which is the image by the first system of the installation axis A1'. Each pixel P of the image IG, IG', therefore has as polar coordinates P(R,θ), its radius R defined as its distance to the reference point and the angle θ of the radius PO.

It is noted that, for some methods, the more the observation elevation angles γ1 and γ2 are different, the more the calculation, in particular the triangulation calculation, will be accurate. If the second observation is "vertical" or almost vertical (γ2 equal to or close to 90 angle degrees), it "sees" no or almost no possible height difference dZi and therefore allows a reliable calculation of the actual radial offset. The complementary observation, obtained according to the first observation elevation angle, will be able to evaluate the height difference dZi with accuracy because it will be possible to compensate by calculation any radial offset, in particular if the first observation elevation angle γ1 is less than or equal to 45° angle degrees, and even more if it is less than 25° angle degrees.

Thus, by repeating these calculations for a determined number N of different directions Di, preferably distributed over the 360 angle degrees around the reference point, it is possible to determine the geometry of the actual ring surface and deduce therefrom the presence of different defects of the ring surface, in particular:

unevenness, for example of the "dip" type, or of the "saddle" type;
defects in roundness;
etc.

Preferably, for all the methods above, a sufficient number N of directions Di will be taken to have, over the 360 angle degrees of the ring surface, sufficiently fine geometric information for the defects to be observed. Preferably, the number of directions Di is chosen so that, over the 360 angle degrees, the two directions Di are not separated by more than 20 angle degrees, preferably not separated by more than 10 angle degrees, more preferably not separated by more than 5 degrees apart. This will result respectively in at least 18 distinct directions, preferably at least 36 distinct directions, more preferably at least 72 distinct directions.

It will be noted that the proposed device and method have the advantage of being able to determine unevenness independently of a possible defect in the roundness of the ring surface, for example an ovalization and, more importantly, independently of a possible defect in centering of the ring surface, defect which may be a defect inherent in the geometry of the container (decentering of the ring surface with respect to the theoretical central axis of the container A1) or which may be a mispositioning of the container in the installation at the time of the inspection (centering of the ring surface with respect to the installation axis A'1). This last point is important because it allows increasing the tolerances for positioning the container during the inspection. This is very significant for an online inspection, in particular at high rate.

They also allow taking into account and measuring the inclination defects of the ring.

In a method in which another representative value will be determined, for example the value of the distance from this second image point to the reference point in the first overall digital image IG, there will be directly the coordinates of the corresponding points of the ring surface in a cylindrical frame.

In all cases, it is thus possible to determine information representative of the three-dimensional geometry of the actual ring surface 16 of the inspected container 14.

This determination can be made, in a device according to the invention, by an image processing system associated with the sensor 18, including in particular for example a computer.

Figure 6:
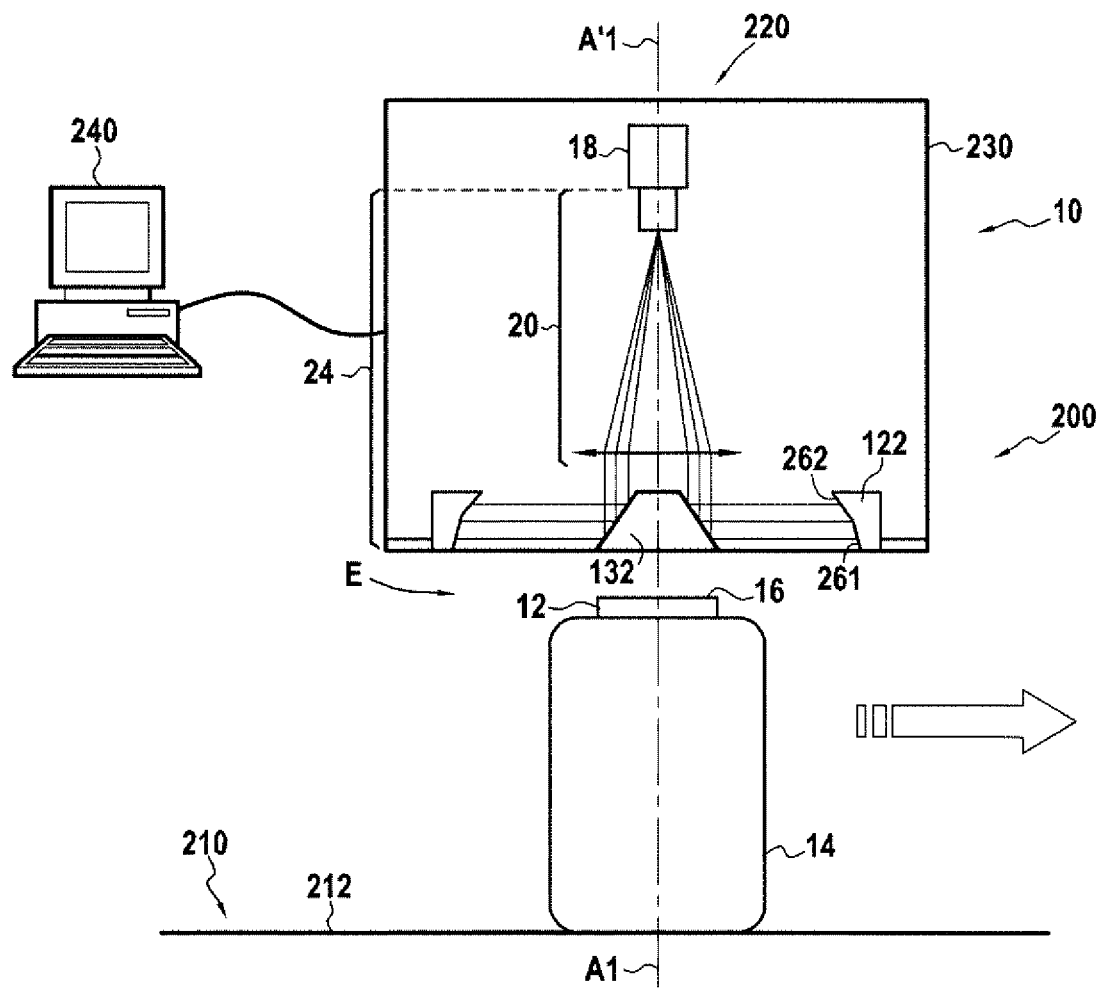
FIG. 6 illustrates an inspection line according to the invention.

FIG. 6 illustrates an inspection line 200 of containers 14 implementing a device 10 according to the invention. In the example illustrated, containers 14 are moved by a conveyor 210 which transports the containers 14 along a direction of movement, for example of horizontal translation perpendicular to the theoretical central axis A1 of the containers 14. In the example illustrated, the conveyor 210 includes a conveyor belt 212 on which the containers 14 are laid by their bottom surface, also called a laying plane, with their theoretical central axis A1 arranged vertically. The conveyor 210 could also include guide means (not represented) cooperating with the lateral faces of the containers 14. The conveyor 210 could also include opposite transport belts, exerting a tightening of the lateral faces of the container for their transportation over a linear portion. The conveyor could include a conveying wheel moving the containers 14 along a circular movement trajectory, in particular in a horizontal plane. The containers 14 thus have their ring surface 16 in a horizontal plane turned upwards. The conveyor 210 brings the containers along the horizontal trajectory below the device 10 according to the invention, without risk of interference with the device 10. The device 10 can be carried by a support, for example in the form of a casing 230, incorporating the device 10, in particular the sensor(s) 18, 18', the lens systems 20, 20', the light source(s) 28, 28', the primary reflection surface(s) 261, 262. The casing 230 is arranged above the conveyor. Inside the casing 230, the device 10 according to the invention is arranged with its installation axis A'1 in a vertical position, so that the observation fields and the incident light beam are oriented downwards, towards the installation area E which is located between the lower face of the casing 230 and the conveyor belt 212. It is therefore understood that, at this inspection station, the conveyor 210 brings the containers so that their theoretical central axis A1 best coincides with the installation axis A'1. At the time of this coincidence, at least a first image and a second image are acquired using the device 10, possibly in the form of a common overall digital image, without this requiring handling the container or stopping the conveyor. The images acquired by the device 10 can then be sent to a processing device 240, for example an image processing system and/or a viewing device and/or an image storage device, for example a computer system comprising a computer. It is then possible to analyze the images thus acquired and to determine the three-dimensional geometry of the ring surface 16 of the container 14.

The camera can be triggered to integrate the images synchronously with the movement of the articles, in particular to freeze the image when aligning the theoretical ring central axis A1 with the installation axis A'1. The integration time is expected to be short, for example less than 1 ms, or even less than 400 μs, in order to reduce the risk of camera shake in the images.

The light source can be pulsed, that is to say produce the lighting for a short period of the flash type, for example less than ims, or even less than 400 μm, in order to reduce the camera shake in the images.

It can be provided that the processing system 240 cooperates with, or includes, a control unit, which drives the light source and the camera, in order to synchronize them with the movement of the articles.

The device and the method are therefore without physical contact with the container to be controlled. A device according to the invention proves to be less costly and of smaller bulk than devices of the prior art, in particular allowing its easy installation in a station or on an article inspection line, inspection station or line which may include other devices intended for other controls, and the device according to the invention can thus be installed in particular in a production line where the containers circulate like a chain. Such a device then allows the control of containers online, whether on a container production line, or on a container processing line, or on a filling line, at high rate.

The invention is not limited to the examples described and represented since various modifications can be made thereto without departing from its scope.

The invention claimed is:

1. A method for determining a three-dimensional geometry of an actual ring surface (16) of a container (14), the ring surface having a theoretical planar and annular or circular geometry about a theoretical central axis (A1), of the type including:

the lighting of the actual ring surface (16) of the container, from above, using a first peripheral incident light beam comprising first incident radial light rays contained in radial planes containing the theoretical central axis (A1) and distributed over 360 angle degrees about the installation axis (A'1), said first incident radial light rays being directed towards the theoretical central axis (A1), and some of the first incident radial light rays of the first incident light beam being reflected by specular reflection on the ring surface (16), in the form of reflected rays (RR1);

the formation, with the reflected rays and via a first optical system (24, 261), of a first planar optical image of the ring surface of the container, on a first two-dimensional photoelectric sensor (18) able to deliver a first overall digital image;

and of the type in which the step consisting in forming a first planar optical image includes the observation of the ring surface (16), from above, by a first optical system (24, 261), according to a first peripheral observation field which observes the ring surface (16) according to first radial observation rays which are contained in radial planes containing the theoretical central axis (A1) and which are distributed at 360 angle degrees about the theoretical central axis (A1), the first peripheral observation field having a first observation elevation angle (γ1) with respect to a plane perpendicular to the theoretical central axis (A1), so as to collect on the first two-dimensional photoelectric sensor, in a first annular area of the sensor, rays reflected to form a first two-dimensional digital image (I161) in a first image area (ZI1) of the first overall digital image delivered by the first sensor;

characterized in that the method comprises:

the formation, via a second optical system (24', 262), of a second planar optical image of the ring surface of the container, distinct from the first planar image, on a second two-dimensional photoelectric sensor (18, 18') able to deliver a second overall digital image, by the observation of the ring surface (16), from above, by the second optical system (24', 262), according to a second peripheral observation field, symmetrical in rotation about the theoretical central axis (A1), which observes the ring (16) according to second radial observation rays which are contained in radial planes containing the theoretical central axis (A1), which are distributed at 360 angle degrees about the theoretical central axis (A1), the second peripheral observation field having a second observation elevation angle (γ2) with respect to a plane perpendicular to the theoretical central axis (A1), but different from the first observation elevation angle (γ1), so as to collect on the second two-dimensional photoelectric sensor, in a second annular area of the sensor, reflected rays to form a second two-dimensional digital image (I162) of the ring surface in a second image area (ZI2) of the second overall digital image delivered by the second sensor;

and in that the method includes the determination, for a number N of analyzed directions (Di) derived from a reference point of the considered digital image and angularly offset from each other around the reference point:

of a first image point of the first two-dimensional digital image of the ring surface (16), on the analyzed direction, and of a first value representative of the distance from this first image point to the reference point in the first digital image;

of a second image point of the second digital image of the ring surface (16), on the analyzed direction, and of a value representative of the distance from this second image point to the reference point in the second digital image;

and in that the method deduces, for the N analyzed directions, by a geometric relation using the N first values, the N second values, the first observation elevation angle (γ1), and the second observation elevation angle (γ2), at least one value representative of an axial position, along the direction of the theoretical central axis (A1), of each of the N points of the actual ring surface (16), whose images by the first optical system (24) and the second optical system (24') are respectively the N first image points and the N second image points.

2. The determination method according to claim 1, characterized in that it includes:

the simultaneous observation of the ring surface (16) by the first optical system (24, 261), according to the first peripheral observation field, and by the second optical system (24, 262), according to the second peripheral observation field;

the simultaneous formation, from the reflected rays collected according to the first and second peripheral observation fields, via the first and second optical systems (24, 261, 262), of the first and of the second two-dimensional image of the ring surface of the container simultaneously both in a first image area (ZI1) corresponding to the observation according to the first peripheral observation field (γ1) and in a second image area (ZI2) corresponding to the observation according to the second peripheral observation field (γ2).

3. The determination method according to claim 1, characterized in that the first optical system (24) includes a first primary reflection surface (261) and the second optical system (24', 262) includes a second primary reflection surface (262), the two primary reflection surfaces (261, 262) being frustoconical surfaces of revolution, each generated by a line segment by revolution about the theoretical central axis (A1), turned towards the theoretical central axis (A1) and arranged to reflect directly or indirectly light rays, coming from the actual ring surface under the corresponding observation elevation angle, in the direction of the associated sensor.

4. The determination method according to claim 1, characterized in that the formation of the first and of the second planar optical image includes for each the optical formation of a complete and continuous two-dimensional image of the actual ring surface (16).

5. The determination method according to claim 1, characterized in that the first peripheral incident light beam includes, in the same radial plane, non-parallel incident radial light rays.

6. The determination method according to claim 1, characterized in that the first incident beam lights the ring surface at an incidence such that, at the point of reflection of a first incident ray, whose ray reflected by the actual ring surface (16) is seen by the first sensor according to the first peripheral observation field, the normal ("n") to the ring surface (16) forms an angle less than 30 angle degrees with respect to the direction of the theoretical central axis (A1).

7. The determination method according to claim 1, characterized in that the second incident beam lights the ring surface at an incidence such that, at the point of reflection of a second incident ray, whose ray reflected by the actual ring surface (16) is seen by the second sensor according to the second peripheral observation field, the normal ("n") to the ring surface (16) forms an angle less than 30 angle degrees with respect to the direction of the theoretical central axis (A1).

8. The determination method according to claim 1, characterized in that the first observation elevation angle (γ1) is less than or equal to 45 angle degrees, preferably less than 25 angle degrees.

9. The determination method according to claim 1, characterized in that the difference between the two observation elevation angles (γ1, γ2) is less than or equal to 20 angle degrees.

10. The determination method according to claim 1, characterized in that the second observation elevation angle (γ2) is greater than 65 angle degrees, preferably greater than or equal to 75 angle degrees.

11. The determination method according to claim 1, characterized in that for the N directions Di, the method deduces, for each direction, by a geometric triangulation relation using the distance from the first image point to the reference point in the first two-dimensional digital image, the distance from the second image point to the reference point in the second two-dimensional digital image, the first observation elevation angle (γ1), and the second observation elevation angle (γ2), at least one value representative of an axial offset, along the direction of the theoretical central axis (A1), between the actual ring surface (16) and a theoretical ring surface.

12. The determination method according to claim 1, characterized in that for the N directions Di:

the first value representative of the distance from the first image point to the reference point in the first two-dimensional digital image is the value of a first radial image offset (dR1i) between a line (I161) representative of the first image of the ring surface (16) and a theoretical line (I161t) representative of a theoretical ring surface image in the first image;

the second value representative of the distance from the second image point to the reference point in the second two-dimensional digital image is the value of a second radial image offset (dR2i) between a line (I162) representative of the image of the ring surface (16) and a theoretical line (I162t) representative of a theoretical ring surface image in the second image;

and in that the method deduces, for each direction, by a geometric triangulation relation using the first radial offset, the second radial offset, the first observation elevation angle (γ1), and the second observation elevation angle (γ2), at least one value representative of an axial offset, along the direction of the theoretical central axis (A1), between the actual ring surface (16) and a theoretical ring surface.

13. The determination method according to claim 1, characterized in that a line (I161, I162) representative of the image of the ring surface is the image, formed by the corresponding optical system (24) on the associated sensor (18), of the reflection of the corresponding incident beam on the ring surface (16).

14. The determination method according to claim 1, characterized in that the first and second two-dimensional photoelectric sensors are combined into the same two-dimensional photoelectric sensor (18) delivering a common overall digital image, the first image area (ZI1) and the second image area (ZI2) being disjoint in the common overall digital image.

15. A device for determining a three-dimensional geometry of an actual ring surface (16) of a container (14), the ring surface having a theoretical planar and annular or circular geometry about a theoretical central axis (A1), of the type in which the device (10) has an installation area (E) for a container, this installation area having an installation axis (A'1), of the type comprising:
a first lighting system (28, 140) having a first light source (28) which has the installation axis (A'1) as its axis, which has a diameter greater than the diameter of the ring surface (16) and which is able to provide a first peripheral incident light beam comprising first incident radial light rays contained in radial planes containing the installation axis (A'1) and distributed over 360 angle degrees about the installation axis (A'1), said first incident radial light rays being directed towards the installation axis (A'1);
a first two-dimensional photoelectric sensor (18), connected to an image analysis unit;
a first optical system (24, 261) interposed between the installation area for the container and the first sensor (18) able to form on the sensor (18) a first image (I161) of the ring surface (16) of a container (14) placed in the installation area;
of the type in which the first optical system (24, 261) includes at least a first primary reflection surface (261) arranged in a downstream portion of the field-of-view of the first sensor, the first primary reflection surface (261) being a frustoconical surface of revolution, generated by a line segment by revolution about the installation axis (A'1), turned towards the installation axis, and arranged to reflect, directly or indirectly, in the direction of the first sensor (18) first light rays coming from the installation area according to radial planes containing the installation axis (A'1) and according to a first peripheral observation field having a first observation elevation angle (γ1) with respect to a plane perpendicular to the installation axis (A1) thus defining a first peripheral observation field which observes the ring surface (16) according to first radial observation rays which are contained in a radial plane containing the installation axis (A'1), which are distributed at 360 angle degrees about the theoretical central axis (A1), and which form with respect to a plane perpendicular to the installation axis (A'1) the first observation elevation angle; and of the type in which the first lighting system (28, 140), the first sensor (18) and the first optical system (24, 261) are arranged above the installation area;
characterized in that the device includes a second optical system (24, 262), interposed between the installation area for the container and a second two-dimensional photoelectric sensor (18), and able to form on the sensor (18) a second image (I162) of the ring surface (16) of a container (14) placed in the installation area;
in that the second sensor (18) and the second optical system (24, 262) are arranged above the installation area;
in that the second optical system (24, 262) is configured to conduct, directly or indirectly, in the direction of the second sensor (18), second light rays coming from the installation area according to radial planes containing the installation axis (A'1) and according to a second peripheral observation field having a second observation elevation angle (γ2) with respect to a plane perpendicular to the installation axis (A'1) thus defining a second peripheral observation field which observes the ring surface (16) according to second radial observation rays which are contained in a radial plane containing the installation axis (A'1), which are distributed at 360 angle degrees about the theoretical central axis (A1), which form with respect to a plane perpendicular to the installation axis (A'1) the second observation elevation angle (γ2), said second observation elevation angle (γ2) being different from the first observation elevation angle (γ1);
and in that the first optical system and the second optical system determine for the first sensor and for the second sensor respectively a first upstream field-of-view portion and a second upstream field-of-view portion which overlap in the installation area according to a useful volume of inspection (VUI) of revolution about the installation axis (A'1), such that any object point placed in the useful volume, and illuminated by at least the first light source so to be imaged by a first image point in the first image formed by the first optical system on the first sensor, is also imaged by a second image point in the second image formed by the second optical system on the second sensor.

16. The device according to claim 15, characterized in that, in the first upstream field-of-view portion determined by the first optical system for the first sensor, the first radial observation rays determined by the first optical system are, when followed from the useful inspection volume (VUI), centripetal in the direction of the installation axis, then intersect the installation axis to become centrifugal in the direction of the first optical system (24, 261).

17. The device according to claim 15, characterized in that the device forms two complete, distinct and continuous optical images (I161, I162) of the actual ring surface (16) on the associated two-dimensional photoelectric sensor (18).

18. The device according to claim 15, characterized in that the first primary reflection surface (261) indirectly reflects light rays in the direction of the sensor (18), and in that the device includes, between the first primary reflection surface (261) and the first sensor (18), at least one secondary reflection surface (132).

19. The device according to claim 15, characterized in that the second optical system includes at least a second primary reflection surface (262) in a downstream portion of the field-of-view of the second sensor (18), the second primary reflection surface being a frustoconical surface of revolution, generated by a line segment by revolution about the installation axis, turned towards the installation axis and arranged to reflect directly or indirectly in the direction of the sensor (18), light rays, coming from the installation area according to radial planes containing the installation axis (A'1) and according to the second peripheral observation field having the second observation elevation angle (γ2) with respect to a plane perpendicular to the installation axis (A'1).

20. The device according to claim 19, characterized in that the first primary reflection surface (261) and the second primary reflection surface (262) indirectly reflect light rays in the direction of the sensor (18), and in that the device includes between, on the one hand, the first primary reflection surface (261) and the second primary reflection surface (262) and, on the other hand, the common sensor (18), at least one secondary reflection surface (132) of revolution about the installation axis (A'1).

21. The device according to claim 19, characterized in that the first primary reflection surface (261) and the second primary reflection surface (262) each include a frustoconical surface of revolution, turned towards the installation axis (A'1), having a small diameter and a large diameter both greater than the largest diameter of the theoretical ring surface so as to return, in the direction of the installation axis (A'1), light rays, coming from the actual ring surface (16) under the corresponding observation elevation angle (γ1, γ2), said rays then being intercepted by a send-back reflection surface (132) which includes a frustoconical surface of revolution (132) turned away from the installation axis (A'1) so as to return the rays in the direction of the associated sensor (18).

22. The device according to claim 21, characterized in that the trajectory of the rays between the two primary reflection surfaces (261, 262) and the send-back reflection surface (132) is perpendicular to the installation axis (A'1).

23. The device according to claim 21, characterized in that the first primary reflection surface (261) and the second primary reflection surface (262) are each a concave frustoconical surface and having an apex half-angle (a1, a2) equal to half of the observation elevation angle (γ1, γ2), and having a small diameter and a large diameter both greater than the smallest diameter of the theoretical ring surface.

24. The device according to claim 15, characterized in that the first observation elevation angle (γ1) is less than or equal to 45 angle degrees, preferably less than 25 angle degrees.

25. The device according to claim 15, characterized in that the difference between the two observation elevation angles (γ1, γ2) is less than 20 angle degrees.

26. The device according to claim 15, characterized in that, in the second upstream field-of-view portion determined by the second optical system for the second sensor, the second radial observation rays determined by the second optical system are, when followed from the useful inspection volume (VUI), centripetal in the direction of the installation axis, then intersect the installation axis to become centrifugal in the direction of the second optical system (24', 262).

27. The device according to claim 19, characterized in that the second primary reflection surface (262) directly reflects light rays in the direction of the second sensor (18), without secondary reflection surface of revolution.

28. The device according to claim 27, characterized in that, in the second upstream field-of-view portion determined by the second optical system for the second sensor, the second radial observation rays determined by the second optical system are, when followed from the useful inspection volume (VUI), centrifugal in the direction of the second primary reflection surface (262).

29. The device according to claim 15, characterized in that, in the second upstream field-of-view portion determined by the second optical system for the second sensor, the second radial observation rays determined by the second optical system are, when followed from the useful inspection volume (VUI), parallel to the installation axis or centripetal in the direction of the installation axis without intersecting the installation axis (A'1) up to the second optical system.

30. The device according to claim 29, characterized in that the second optical system is devoid of any reflection surface of revolution.

31. The device according to claim 15, characterized in that the second observation elevation angle (γ2) is greater than 65 angle degrees, preferably greater than or equal to 75 angle degrees.

32. The device according to claim 31, characterized in that the first observation elevation angle (γ1) is less than or equal to 45 angle degrees, preferably less than 25 angle degrees.

33. The device according to claim 15, characterized in that the first optical system includes a telecentric optical system (20).

34. The device according to claim 15, characterized in that the second optical system includes a telecentric optical system (20).

35. The device according to claim 15, characterized in that the first and second two-dimensional photoelectric sensors are combined into the same common two-dimensional photoelectric sensor (18), the first primary reflection surface (261) and the second primary reflection surface (262) both being in disjoint portions of the downstream field-of-view of the sensor.

36. The device according to claim 15, characterized in that the first light source (28) is an annular source of revolution the axis of which is the installation axis (A'1).

37. A line for inspecting (200) containers (14) having a ring surface (16), of the type in which containers (14) are moved on a conveying line by a conveyor (210) which transports the containers (14) along a horizontal direction of movement perpendicular to a theoretical central axis (A1) of the containers 14 which thus have their ring surface (16) in a horizontal plane turned upwards, characterized in that the installation includes a device (10) according to claim 15, which is arranged on the installation with its installation axis (A'1) in a vertical position, such that the observation fields and the incident light beams are arranged downwards, towards the installation area (E) which is located between the device and a transport member of the conveyor (212).

38. The inspection line (200) according to claim 37, characterized in that the conveyor (210) brings the containers such that their theoretical central axis (A1) coincides with the installation axis (A'1) and, at the time of this coincidence, at least one image is acquired thanks to the device (10), without contact of the device (10) with the container (14).

* * * * *